US008543932B2

(12) United States Patent
Fields et al.

(10) Patent No.: US 8,543,932 B2
(45) Date of Patent: Sep. 24, 2013

(54) GENERATION AND TESTING OF GRAPHICAL USER INTERFACE FOR MATTER MANAGEMENT WORKFLOW WITH COLLABORATION

(75) Inventors: Christopher Paul Fields, Houston, TX (US); David Everett Easterby, Houston, TX (US)

(73) Assignee: DataCert, Inc., Houston, TX (US)

( * ) Notice: Subject to any disclaimer, the term of this patent is extended or adjusted under 35 U.S.C. 154(b) by 252 days.

(21) Appl. No.: 12/766,847

(22) Filed: Apr. 23, 2010

(65) Prior Publication Data

US 2011/0265020 A1 Oct. 27, 2011

(51) Int. Cl.
*G06F 3/00* (2006.01)
*G06F 11/36* (2006.01)

(52) U.S. Cl.
CPC ............ *G06F 11/3668* (2013.01); *G06F 11/36* (2013.01)
USPC ........... 715/762; 715/866; 715/760; 715/780; 715/744; 715/733; 709/203; 705/7.13; 705/7.12; 705/2; 705/35; 707/608

(58) Field of Classification Search
CPC .............................. G06F 11/3668; G06F 11/36
USPC ................ 715/762, 866, 760, 780, 744, 733; 705/7.13, 7.12, 2, 35; 709/203; 717/124
See application file for complete search history.

(56) References Cited

U.S. PATENT DOCUMENTS

| 5,450,545 | A | | 9/1995 | Martin et al. | |
|---|---|---|---|---|---|
| 5,703,788 | A | * | 12/1997 | Shei et al. | 716/102 |
| 5,969,717 | A | * | 10/1999 | Ikemoto | 715/762 |
| 6,622,247 | B1 | * | 9/2003 | Isaak | 713/155 |
| 6,622,298 | B1 | | 9/2003 | Stamm | |
| 6,859,922 | B1 | | 2/2005 | Baker et al. | |
| 7,039,899 | B1 | | 5/2006 | Quiroga | |
| 7,093,238 | B2 | | 8/2006 | Givoni et al. | |
| 7,127,405 | B1 | * | 10/2006 | Frank et al. | 705/310 |
| 7,263,663 | B2 | * | 8/2007 | Ballard et al. | 715/762 |
| 7,392,506 | B2 | * | 6/2008 | Garcowski et al. | 717/107 |
| 7,401,094 | B1 | | 7/2008 | Kesler | |
| 7,505,983 | B2 | * | 3/2009 | Wildhagen et al. | 707/791 |
| 7,558,633 | B2 | * | 7/2009 | Bleumer et al. | 700/26 |
| 7,644,368 | B2 | * | 1/2010 | Pins | 715/762 |

(Continued)

OTHER PUBLICATIONS

Brambilla, M., D'Elia, N., "Exception Handling Within Workflow-based Web Applications," Proceedings of the 4th International Conference on Web Engineering, ICWE 2004, vol. 3140, Jul. 2004, 14 pages.

*Primary Examiner* — Ece Hur
(74) *Attorney, Agent, or Firm* — Osha Liang LLP

(57) ABSTRACT

A method including obtaining metadata specifying screens based on a business logic of the matter management workflow, generating, based on the metadata, the screens each including screen objects, where the matter management workflow includes a sequence of the screen objects specified by the metadata based on the business logic, receiving a matter management user input via the screen objects to navigate the matter management workflow, receiving a screen tester user input specifying a test instruction including a first specification based on the screen objects, generating, using the first specification and without further user intervention, a test sequence including a second specification based on the metadata, applying the test sequence to the screen objects to generate a first result depicting an evaluation of navigating the matter management workflow according to the business logic, and generating an alert in response to the first result indicating a violation to the business logic.

26 Claims, 17 Drawing Sheets

(56) References Cited

U.S. PATENT DOCUMENTS

| | | |
|---|---|---|
| 7,676,794 B2 | 3/2010 | Akiyama et al. |
| 7,813,978 B2* | 10/2010 | Abbott et al. .................. 705/35 |
| 7,873,946 B2* | 1/2011 | Lathrop et al. ................ 717/125 |
| 7,904,406 B2* | 3/2011 | Kumbi et al. .................. 706/47 |
| 7,970,596 B2* | 6/2011 | Bade et al. ..................... 703/13 |
| 7,979,893 B2* | 7/2011 | Ontaneda et al. ................ 726/2 |
| 8,020,144 B2* | 9/2011 | Yang et al. .................... 717/106 |
| 8,117,131 B2* | 2/2012 | Boozer ......................... 705/310 |
| 2002/0029377 A1* | 3/2002 | Pavela ........................... 717/124 |
| 2002/0038450 A1* | 3/2002 | Kloppmann et al. ......... 717/102 |
| 2002/0128883 A1* | 9/2002 | Harris ............................... 705/4 |
| 2002/0152254 A1* | 10/2002 | Teng ............................... 709/100 |
| 2002/0165912 A1* | 11/2002 | Wenocur et al. ............. 709/203 |
| 2003/0078816 A1* | 4/2003 | Filep ................................. 705/4 |
| 2005/0246274 A1* | 11/2005 | Abbott et al. .................... 705/40 |
| 2006/0022972 A1* | 2/2006 | Garcowski et al. ........... 345/418 |
| 2006/0179422 A1* | 8/2006 | Gortler ........................... 717/124 |
| 2006/0195430 A1* | 8/2006 | Arumainayagam et al. ...... 707/3 |
| 2006/0195817 A1* | 8/2006 | Moon ............................ 717/104 |
| 2006/0212487 A1 | 9/2006 | Kennis et al. |
| 2006/0218450 A1* | 9/2006 | Malik et al. ..................... 714/47 |
| 2007/0089091 A1 | 4/2007 | Larab et al. |
| 2007/0112858 A1* | 5/2007 | Maughan et al. .......... 707/104.1 |
| 2007/0186169 A1* | 8/2007 | Osborne et al. ............... 715/734 |
| 2007/0203737 A1* | 8/2007 | Boozer ............................ 705/1 |
| 2007/0214034 A1* | 9/2007 | Ihle et al. ........................... 705/9 |
| 2007/0239570 A1 | 10/2007 | Kam-Chak Cheng et al. |
| 2007/0242082 A1* | 10/2007 | Lathrop et al. ................ 345/619 |
| 2007/0288518 A1* | 12/2007 | Crigler et al. ............. 707/104.1 |
| 2008/0086348 A1 | 4/2008 | Rao et al. |
| 2008/0086499 A1 | 4/2008 | Wefers et al. |
| 2008/0086627 A1* | 4/2008 | Splaine et al. ................ 712/227 |
| 2008/0120602 A1 | 5/2008 | Comstock et al. |
| 2008/0134198 A1* | 6/2008 | Grasselt et al. ............... 718/106 |
| 2008/0228861 A1* | 9/2008 | Tadauchi et al. .............. 709/203 |
| 2008/0282231 A1 | 11/2008 | R et al. |
| 2008/0288621 A1* | 11/2008 | Snell et al. .................... 709/223 |
| 2008/0313120 A1* | 12/2008 | Kumbi et al. ................... 706/47 |
| 2009/0006409 A1* | 1/2009 | Yang et al. ........................ 707/9 |
| 2009/0281758 A1* | 11/2009 | Cake et al. .................... 702/123 |
| 2009/0320002 A1* | 12/2009 | Peri-Glass et al. ........... 717/131 |
| 2010/0077260 A1 | 3/2010 | Pillai et al. |
| 2010/0095202 A1* | 4/2010 | Ishizuka ....................... 715/255 |
| 2010/0185693 A1* | 7/2010 | Murty et al. .................. 707/803 |
| 2011/0138357 A1* | 6/2011 | Mishra et al. ................. 717/124 |
| 2011/0258698 A1* | 10/2011 | Ontaneda et al. ............... 726/21 |
| 2011/0289437 A1* | 11/2011 | Yuen et al. .................... 715/762 |
| 2012/0084772 A1* | 4/2012 | Shadi et al. ................... 717/177 |

\* cited by examiner

Matter Management Workflow Screen:
"Rate Request"
600

Subject 601

Note 602

Vendor List 603

FIG. 6

Matter Management Workflow Remote Screen:
"Time Keeper Request List View"
700a

Vendor Account Login 701

Welcome, QID (VENDOR) - SDDEV2 (QID) ACCOUNT
User Guide | My Account | Log Out

ShareDoc

Home > Clients > SD3 EXTERNAL DEMO

Timekeeper Requests

[ New Law Firm Initiated Request ]

| Pending Requests | Archived Requests |

« first ‹ prev 1 next › last » Page size: 25

| Status ▼ | Requested Date | Law Firm Initiated | Review Start Date | Review End Date | Review Due Date | Last Modified Date |
|---|---|---|---|---|---|---|
| Pending | | | 2010-06-01 | | 2009-10-08 | Thu Oct 08 17:03:02 -0500 2009 |
| Pending | | ✓ | 2009-10-09 | | 2009-10-09 | Fri Oct 09 09:43:16 -0500 2009 |
| Pending | | ✓ | 2009-10-09 | | 2009-10-09 | Fri Oct 09 11:50:08 -0500 2009 |
| Pending | | ✓ | 2009-10-01 | 2009-10-31 | 2009-10-09 | Fri Oct 09 14:40:21 -0500 2009 |
| Pending | 2009-10-13 | | 2009-01-01 | 2009-12-31 | 2009-10-30 | Tue Oct 13 06:57:51 -0500 2009 |

Time Keeper Request List 702

FIG. 7A

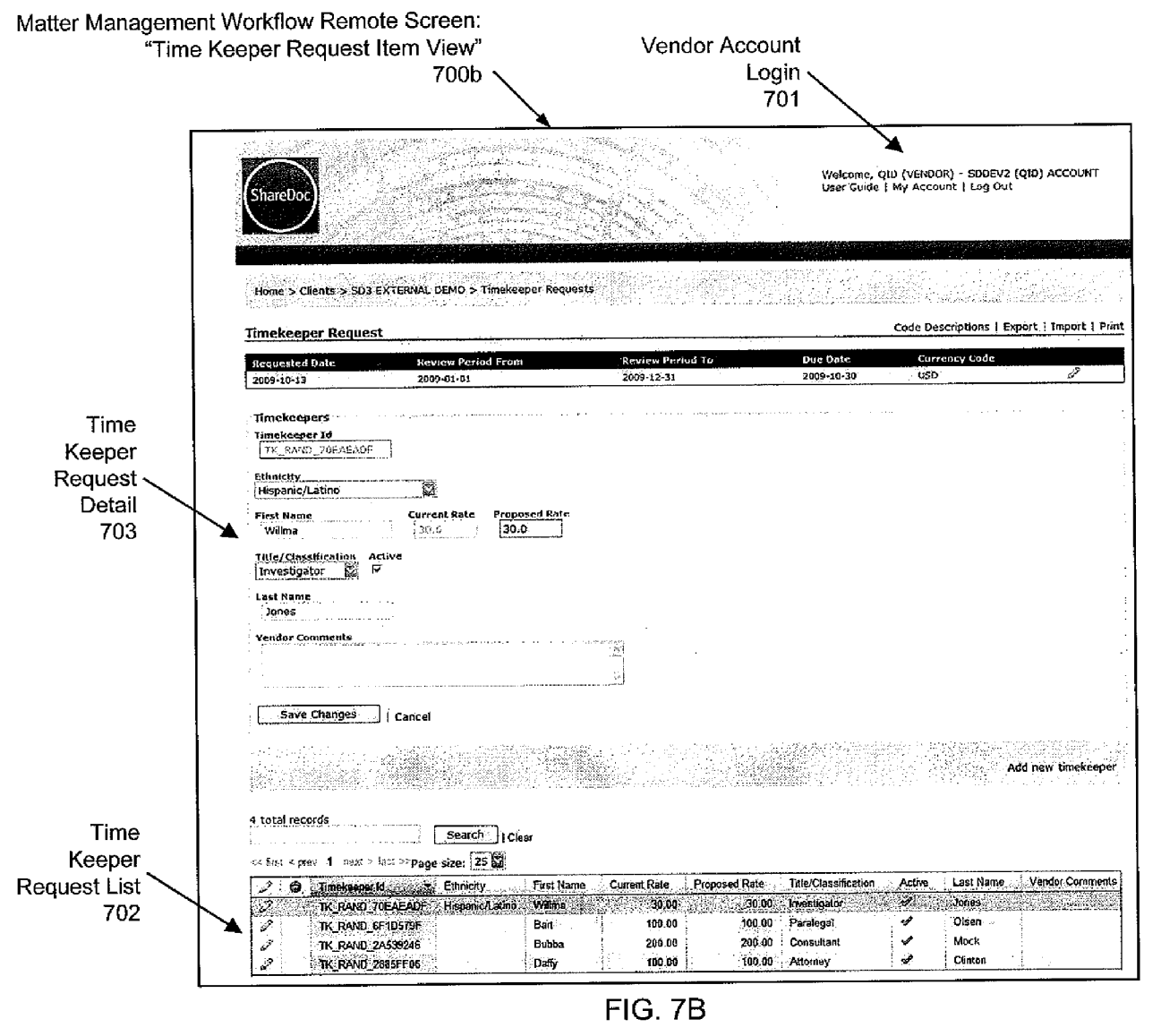

Matter Management Workflow Remote Screen:
"Time Keeper Request Item View"
700b

Vendor Account Login 701

Time Keeper Request Detail 703

Time Keeper Request List 702

FIG. 7B

Screen Tester UI:
Test Specification Library
800b

Settings | Tests | Test Plans | Test Environments

IP of Test Server: 10.9.123.3
Test Server Status: Running
Current Environment Web Server: 10.32.11.213:8080

Fixtures Documentation

Expand all   Close all   Generate Test Plan   Delete All

| Test Name | Test Description |
|---|---|
| MM_MA_CreateLitMatter | This test creates a Litigation Matter. |
| MM_MA_CreateMatterNarratives_2 | This test creates matter related narratives using the matter's sub-tabs. |
| MM_MA_CreateMatterOrg | This test relates an existing internal and external org to the Automatter Lit Test matter. |
| MM_MA_DeleteMatters | |
| MM_MA_EditMatter | This tests editing a matter record. |
| MM_MA_MatterDocumentsTabUI | This test checks the UI for the Documents tab in Show and Edit mode |
| MM_MA_MatterListUI | This test verifies column header labels, column sorting, and checks for Add, Delete, Bulk Edit and Copy buttons. |
| MM_MA_NewMatterUI_1 | This tests the UI for matters created using the New toolbar. |
| MM_MA_NewMatterUI_2 | This tests the UI for new matters created using the Add button on the Matter List page. |
| MM_MA_TabCalendarCRUD | This tests Add, Edit, and Delete for Matter Events. |
| MM_MA_TabCalendarUI | This test checks the UI for the Calendar tab in Show and Edit mode |

FIG. 8B

GENERATION AND TESTING OF GRAPHICAL USER INTERFACE FOR MATTER MANAGEMENT WORKFLOW WITH COLLABORATION

BACKGROUND

Generally speaking, legal case management or matter management refers to a category of law practice management techniques used by law firms, corporate clients, and courts to leverage knowledge and methodologies for managing the life cycle of a case or matter more effectively. In some instances, matter management is distinguished from case management in that case management may refer to law firm related activities ("cases") while matter management may refer to activities involved in managing all aspects of the corporate legal practice ("matters"). Throughout this document, the terms "case management" and "matter management" may be used interchangeably and considered as applicable to a range of different industries (e.g., legal industry, insurance industry, manufacturing industry, etc.). Similarly, the terms "case" and "matter" may be used interchangeably and considered as applicable to any types of organized collection of related information.

Corporations may use matter management software and systems to manage both in-house counsel staffs as well as outside counsel law firms and non-law firm legal service providers (e.g., expert witnesses, court reporters, copy services, etc.) who work on legal matters on behalf of the corporations. This management includes tracking such items as lists of attorneys and other workers assigned the case, types of legal work, pending and resolved issues, documents, budgets, invoices, etc.

As attorneys and law firms compete for clients, they are routinely challenged to deliver services at lower costs with greater efficiency, thus firms develop practice-specific processes and use contemporary technologies to assist in meeting such challenges. Law firms may use matter management software and systems to track time keeping and billing, accurate opening of matters, deadlines and dockets, litigation support (e.g., witnesses, judges, courts, opposing counsels, etc.), conflicts and ethics control, research, communication and collaboration, data mining and modeling, as well as data security, storage, and archive accessibility among many other activities. While such processes and technologies may be customized, they need to be compatible with requirements of various corporate clients and court practices.

As these systems entail the processing and storage of confidential corporate information (e.g., financial data, claims information, privileged legal matter data, etc.), needs exist in the deployment of these systems to provide data security such as capability to handle ethical walls, installation behind corporate security and firewalls in addition to be hosted as Internet-based ASP application, conformance to regulatory requirements (e.g., Sarbanes-Oxley and Health Insurance Portability and Accountability Act (HIPAA) security and audit compliance mandates), etc.

SUMMARY

In general, in one aspect, the invention relates to a method for navigating a matter management workflow using a plurality of screens. The method comprises: obtaining, using a central processing unit (CPU) of a computer system, metadata specifying one or more screens of the plurality of screens based on a business logic of the matter management workflow, wherein the business logic includes descriptions of logical steps to perform tasks of the matter management workflow; generating, using the CPU and based on the metadata, the one or more screens, each comprising a plurality of screen objects, wherein the matter management workflow comprises a sequence of the plurality of screen objects specified by the metadata based on the business logic; receiving, in response to generating the screen, a matter management user input via the plurality of screen objects to navigate the matter management workflow; receiving a screen tester user input specifying a test instruction comprising a first specification based on the plurality of screen objects; generating, using the first specification and without further user intervention, a test sequence comprising a second specification based on the metadata; applying the test sequence to the plurality of screen objects to generate a first result, wherein the first result depicts an evaluation of navigating the matter management workflow according to the business logic; and generating an alert in response to the first result indicating a violation to the business logic.

In general, in one aspect, the invention relates to method for navigating a matter management workflow using of a plurality of screens. The method comprises: receiving a screen designer user input identifying a plurality of screen objects of the plurality of screens and comprising attributes of the plurality of screen objects, wherein the screen designer user input is based on a business logic of the matter management workflow comprising a sequence of the plurality of screen objects; storing the screen designer user input as metadata; generating, using a central processing unit (CPU) of a computer system and based on the metadata, one or more screens of the plurality of screens; receiving, in response to generating the one or more screens, a matter management user input via the plurality of screen objects to navigate the matter management workflow; sending, to a remote computer system and in response to receiving the matter management user input, remote metadata specifying one or more remote screens of the plurality of screens based on the business logic of the matter management workflow, wherein the one or more remote screens comprise a plurality of remote screen objects; generating, using the remote computer system and based on the remote metadata, the one or more remote screens, wherein the matter management workflow further comprises a sequence of the plurality of remote screen objects specified by the remote metadata based on the business logic; displaying the one or more remote screens using a web browser on a remote matter management user device; receiving, in response to displaying the one or more remote screens, a remote matter management user input via the plurality of remote screen objects to further navigate the matter management workflow; receiving a screen tester user input specifying a test instruction comprising a first specification based on the plurality of remote screen objects; generating, based on the first specification and without further user intervention, a test sequence comprising a second specification based on the remote metadata; sending the test sequence to a web testing application for applying to the one or more remote screens displayed on the remote matter management user device; retrieving, in response to sending the test sequence thereto, resultant remote screen content from the remote matter management user device using the web testing application; verifying the resultant remote screen content based on the test sequence to generate an evaluation of navigating the matter management workflow at the remote computer system according to the business logic; and generating an alert in response to the evaluation indicating a violation to the business logic at the remote computer system.

In general, in one aspect, the invention relates to a system for navigating a matter management workflow using a plurality of screens. The system comprises: a central processing unit (CPU); a screen generator executing on a CPU and configured to generate, based on metadata, one or more screens of the plurality of screens comprising a plurality of screen objects, wherein the matter management workflow comprises a sequence of the plurality of screen objects specified by the metadata based on a business logic of the matter management workflow, wherein the business logic includes descriptions of logical steps to perform tasks of the matter management workflow; a test sequence generator executing on a CPU and configured to generate, from a first specification based on the plurality of screen objects, a test sequence comprising a second specification based on the metadata; a repository configured to store the metadata and the test sequence; and memory configured to store instructions executed by the CPU to: obtain the metadata from a repository, generate the one or more screens using the screen generator, receive, in response to generating the one or more screens, a matter management user input via the plurality of screen objects to navigate the matter management workflow, receive a screen tester user input specifying a test instruction comprising a first specification based on the plurality of screen objects, generate the test sequence using the test sequence generator, apply the test sequence to the plurality of screen objects to generate a first result, wherein the first result depicts an evaluation of navigating the matter management workflow according to the business logic, and generate an alert in response to the first result indicating a violation to the business logic.

In general, in one aspect, the invention relates to a non-transitory computer readable storage medium storing instructions for navigating a matter management workflow using a plurality of screens. The instructions, when executed by a computer, comprising functionality to: obtain, using a central processing unit (CPU) of a computer system, metadata specifying one or more screens of the plurality of screens based on a business logic of the matter management workflow, wherein the business logic includes descriptions of logical steps to perform tasks of the matter management workflow; generate, using the CPU and based on the metadata, the one or more screens, each comprising a plurality of screen objects, wherein the matter management workflow comprises a sequence of the plurality of screen objects specified by the metadata based on the business logic; receive, in response to generating the screen, a matter management user input via the plurality of screen objects to navigate the matter management workflow; receive a screen tester user input specifying a test instruction comprising a first specification based on the plurality of screen objects; generate, using the first specification and without further user intervention, a test sequence comprising a second specification based on the metadata; apply the test sequence to the plurality of screen objects to generate a first result, wherein the first result depicts an evaluation of navigating the matter management workflow according to the business logic; and generate an alert in response to the first result indicating a violation to the business logic.

Other aspects of the invention will be apparent from the following description and the appended claims.

BRIEF DESCRIPTION OF DRAWINGS

FIGS. 3A-9C depict screenshots of an example workflow management system in accordance with one or more embodiments of the invention.

DETAILED DESCRIPTION

Figure 1A:
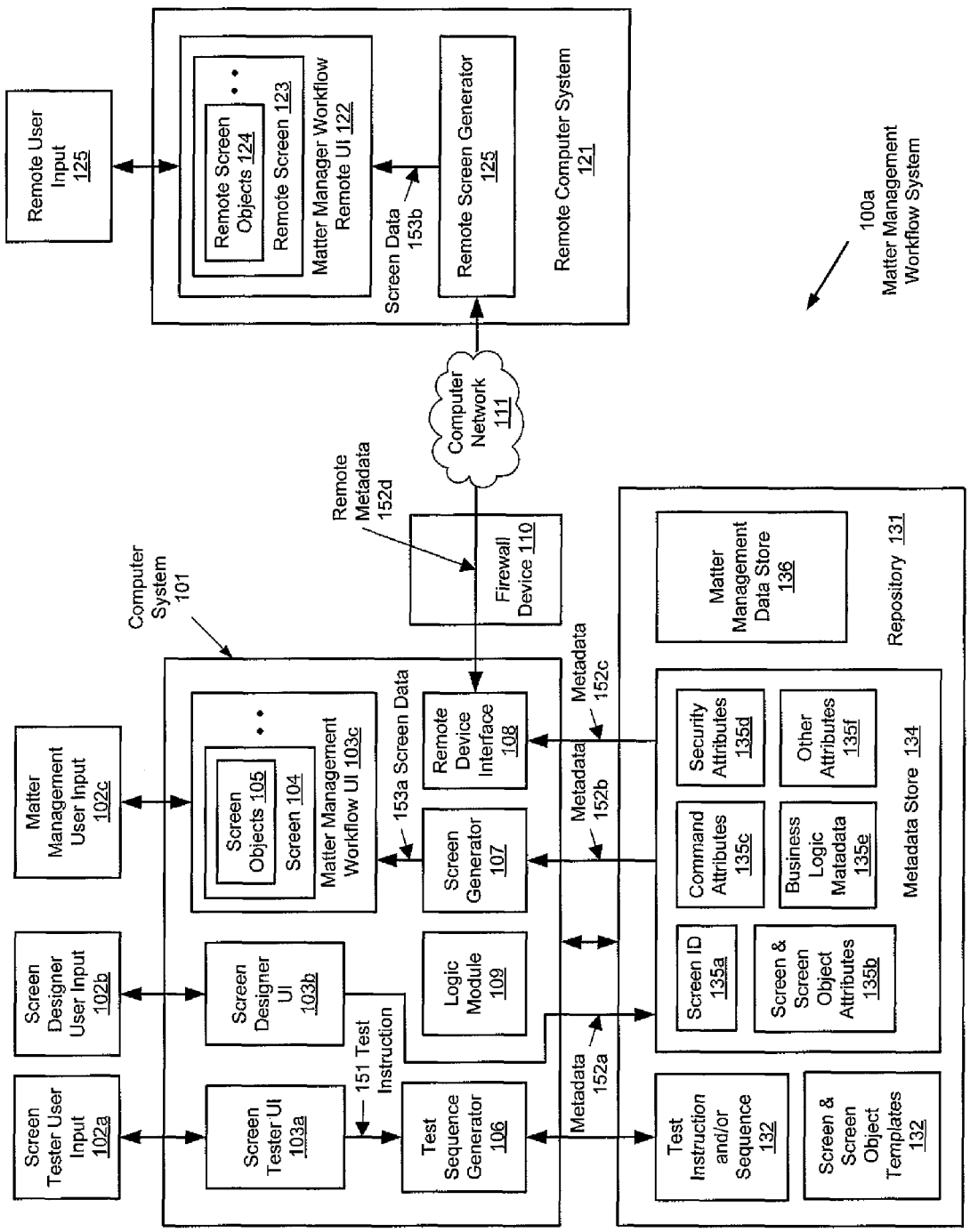
FIG. 1A depicts a schematic block diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Generally speaking, matter management workflow is associated with specific data (i.e., matter management workflow data) related to a business entity (i.e., a corporation, a law firm, a court, an insurance company, a third party damage adjustor, a police department, etc.) practicing the matter management workflow. Typically, such workflow is specific to the business practices of the business entity. Throughout this document depending on the context, the term "business entity" may be used to refer to a private business entity, a government entity, as well as vendors/customers/affiliates thereof. The term "matter" may be used to refer to any type of organized collection of related information, such as information related to timer keeper billing, claim processing, shipping and invoicing, contract administration, or any type of project management activities. For example in the case of a corporate legal department or a law firm, the matter management workflow data may include lists of attorneys and other workers assigned the case, types of legal work, pending and resolved issues, documents, budgets, invoices, time keeping and billing information, opened and closed matters, deadlines and dockets, litigation support information (e.g., witnesses, judges, courts, opposing counsels, etc.), conflicts and ethics control parameters, etc. Specifically, the matter management workflow allows a matter management workflow user (e.g., a docketing clerk, an accountant, a lawyer, a corporate counsel, etc.) accessing (e.g., adding, deleting, modifying, etc.) matter management workflow data using a collection of screens (i.e., graphical user interface (GUI)) to complete a matter management workflow result (i.e., to perform a task such as opening, updating, or closing a matter, requesting billing rate updates, generating billing and/or invoices, etc.). Accordingly, the screens and data flows of the matter management workflow reflect logical steps of the business practices. Throughout this document, the term "business logic" refers to underlying logic to such logical steps of the business practices and the activities of navigating the matter management workflow to perform business tasks are referred to as performing the matter management workflow or practicing the matter management workflow.

One or more embodiments of the invention relate to a system and method for generating and testing screens of the matter management workflow based on shared metadata created from business logic and then receiving user inputs via such automatically generated and tested (i.e., verified/validated as consistent with the business logic) screens to perform business task by navigating the matter management workflow. In particular, the automatically generated test may be used for regression testing for validating incremental modifications to the matter management workflow, for example to address additional tasks of the business entity itself or expand compatibility with practices of collaborating entities. In one embodiment of the invention, the metadata may be shared between the screen generation process (e.g., used by a screen designer user) and the test generation process (e.g., used by a screen tester user). For example, test sequences based on screen generating metadata are converted automatically from a test instruction based on screen objects and are applied to the automatically generated (i.e., from the metadata) screens to verify that the matter management workflow is performed consistent with the business logic of the business entity. Further, a limited portion (e.g., designated for collaboration) of the metadata may be shared between a corporation practicing the matter management workflow and a vendor of the corporation that is allowed to perform a limited portion (i.e., designated for collaboration) of the matter management workflow. For example, the metadata is associated with data level security attributes allowing collaboration across the corporate fire walls with outside law firms.

In one or more embodiments of the invention, a matter management workflow practiced by a business entity may include a collection of workflow sequences each having an ordered list of tasks for completing a specific workflow result. Each task may be performed using one or more GUI screens. Generally speaking, the specifics of each workflow sequence as well as the associated screens and workflow result depend on the nature of the business entity as embodied in the business logic. For example, a workflow sequence for a law firm may include a "creating a new matter" sequence. Example tasks of this workflow sequence may include "obtaining a new matter number" and "create the new matter using the new matter number." For example, a result of this workflow sequence may be creating the new matter for the law firm. As noted above, one or more screens may be engaged by a user (i.e., matter management workflow user) to complete the example result of creating the new matter for the law firm. The screen designer user, the screen tester user, and the matter management workflow user may be the same person or may be different persons. For example, the screen designer user and the screen tester user may belong to an information technology (IT) support department of the business entity while the matter management workflow user may belong to an operating department of the business entity or even a vendor of the business entity. Throughout this document, the term "user" may refer to any of the screen designer user, screen tester user, or matter management workflow user depending on the context. Further, the term "screen" generally refers to matter management workflow screen instead of screen designer UI or screen tester UI unless specified otherwise.

In one or more embodiments of the invention, the business logic (e.g., the logical steps to create a new matter) is represented in metadata format while a workflow sequence (e.g., creating a new matter) is associated with a sequence of screens (e.g., new matter number screen, create matter screen, etc.) and screen objects (e.g., data entry fields such as "matter name" and "matter number" as well as action buttons such as "save" and "search next available matter number"). Generally speaking, the business logic metadata is organized hierarchically. For example, the highest level business logic metadata may have a human readable representation as a set of instructions following which a human user may initiate logical steps to complete a matter management workflow result. An example instruction may include "using the next available matter number to create a new matter." For each human readable instruction, the corresponding business logic metadata at the highest level may be associated/linked with lower level business logic metadata relating to underlying machine readable instructions adapted to implement each of the human initiated logical steps. For example, the lower level business logic metadata may relate to machine readable descriptions of how to obtain the next available matter number and how to create a new matter therefrom.

In one or more embodiments of the invention, the screens and screen objects are specified by a screen designer (e.g., an employee or contractor of the corporation or law firm) following the intent of the business logic (e.g., via skills acquired from business practice training and/or based on the aforementioned human readable representation (e.g., steps to create a matter) of the highest level business logic.) For example, the screens and screen objects are manually specified using screen designer user interface (UI) based on a library of screen templates and screen object templates where the screen designer inputs for such specification are stored as metadata for generating the set of screens used for performing the matter management workflow. An example screen (e.g., new matter number screen) may have a data entry field (i.e., a screen object) for receiving a manually entered matter number, an action button (i.e., a screen object) for searching the next available matter number from the matter management data, and another action button (i.e., a screen object) for saving the manually entered or automatically searched matter number. After this example screen is specified and generated, a matter management workflow user may either manually enter the next available matter number or use the action button to initiate an automatic search for the next available matter number. While screens and screen objects are defined/configured using the respective templates, throughout this document, the terms "screen object" and "screen object template" may be used interchangeably depending on context. Similarly, the terms "screen" and "screen template" may also be used interchangeably depending on context.

In one or more embodiments of the invention, the metadata (i.e., screen generating metadata) for generating screens of the matter management workflow is automatically created from the business logic metadata in its hierarchical format, for example via an automatic compilation process. An example compilation process may include the functionality to (1) first translate the example high level business metadata corresponding to "using the next available matter number to create a new matter" into lower level business logic metadata of machine readable descriptions of "obtaining the next available matter number" and "creating a new matter from the next available matter number" and (2) subsequently translate the machine readable description of "obtaining the next available matter number" into metadata describing the aforementioned example "new matter number screen."

In one or more embodiments of the invention, a portion of the screen generating metadata is automatically created from business logic metadata while other portion of the screen generating metadata is manually specified by screen designer user. In some embodiments of the invention, automatic creation of screen generating metadata may be supplemented with manual specification by screen designer user. In other embodiments of the invention, manual specification of screen generating metadata may be assisted by automatic creation from business logic metadata.

Accordingly, a screen of a workflow sequence in the matter management workflow may be automatically generated based on corresponding screen generating metadata created in accordance with one or more embodiments of the invention. As a matter management workflow user (e.g., a clerk of a corporation or a law firm) follows the intent of the business logic (e.g., via skills acquired from business practice training and/or based on a human readable representation of the business logic (e.g., steps to create a matter)) to perform the matter management workflow using the automatically generated screens, a sequence of screen objects (e.g., data entry field, action button, etc.) are engaged to complete the workflow result (e.g., creating the specified matter by obtaining a next available matter number).

One or more embodiments of the invention may include one or more portions of the techniques described above. Further details of the automatic screen generation described above as well as automatic screen test generation within a collaboration environment, are described below.

FIG. 1A depicts a schematic block diagram of a matter management workflow system (100a) in accordance with one or more embodiments of the invention. In one or more embodiments of the invention, one or more of the modules and elements shown in FIG. 1A may be omitted, repeated, and/or substituted. Accordingly, embodiments of the invention should not be considered limited to the specific arrangements of modules shown in FIG. 1A.

As shown in FIG. 1A, the matter management workflow system (100a) includes a screen tester user input (102a), a screen designer user input (102b), a matter management workflow user input (102c), a remote user input (125), a computer system (101) with an associated repository (131) and a firewall device (110), and a remote computer system (121) coupled to the computer system (101) via a computer network (111) and the firewall (110). For example, the computer system (101) and/or the remote computer system (121) may be any type of computer platform such as desktop computer, computer workstation, computer server, notebook computer, handheld computer, mobile digital assistant, smart telephone, etc. including the computer system shown in FIG. 10 and described below. In addition, the firewall (110) may be any type of hardware or software network security device that is configured to block unauthorized access and permit authorized communications. Further, the computer network (111) may include wired and/or wireless portions of the Internet and/or other data communications networks.

As shown in FIG. 1A, the computer system (101) includes a screen tester UI (103a), a screen designer UI (103b), a matter management workflow UI (103c), a test sequence generator (106), a logic module (109), a screen generator (107), and a remote device interface (108). Similarly, the remote computer system (121) includes a remote screen generator (125) and a matter management workflow remote UI (122). In addition, the repository (131) is configured to store a test instruction and/or sequence (132) and a screen and screen object templates (132) as well as to include a matter management workflow data store (136) capable of storing matter management workflow data (not shown) and a metadata store (134) capable of storing a screen ID (135a), screen and screen object attributes (135b), command attributes (135c), security attributes (135d), business logic metadata (135e), and other attributes (135f). For example, the aforementioned data may be organized using various data structures such as database (e.g., relational, object oriented, etc.), file, linked list, or other appropriate data organizations.

In one or more embodiments of the invention, the computer system (101) includes a matter management workflow UI (103c) configured to present matter management workflow screens (e.g., GUI screen (104) having screen objects (105)) to a user (not shown) and receive matter management workflow user input (102c), which is processed by the logic module (109) to navigate the matter management workflow and perform necessary tasks based on a business logic. As noted above, a matter management workflow is used for tracking business management data (e.g., lists of attorneys and other workers assigned the case, types of legal work, pending and resolved issues, documents, budgets, invoices, time keeping and billing information, opened and closed matters, deadlines and dockets, litigation support information (e.g., witnesses, judges, courts, opposing counsels, etc.), conflicts and ethics control parameters, etc.).

A portion of the business management data may be directly received from the matter management workflow user input (102c) while other portion may be derived from the matter management workflow user input (102c). In one or more embodiments, such business management data is organized in the matter management data store (136) as data objects and indexed based on the particular screen or screen sequence via which the corresponding matter management workflow user input (102c) is received. An instance of a data object instantiated using the matter management workflow user input (102c) is referred to as a data item, which may be associated with additional attributes such as date of data entry. Typically, a user (e.g., a docketing clerk, an accountant, a lawyer, a corporate counsel, etc.) traverses a number of screen objects (e.g., screen objects (105)) in various screens (e.g., screen (104)) when navigating the matter management workflow to perform a task. Such screens and screen objects form a sequence (i.e., screen sequence and/or screen object sequence) of the matter management workflow. Typically, such a sequence is specific to a particular workflow task being performed and is established based on the business logic. Generally, the business logic includes descriptions of logical steps to perform tasks of the matter management workflow, which may be a mental concept embodied in practices established though experience/training or paper documents prepared as business operation guidelines. As noted above, in one or more embodiments, the business logic may also have structured representation in metadata format.

Figure 6:
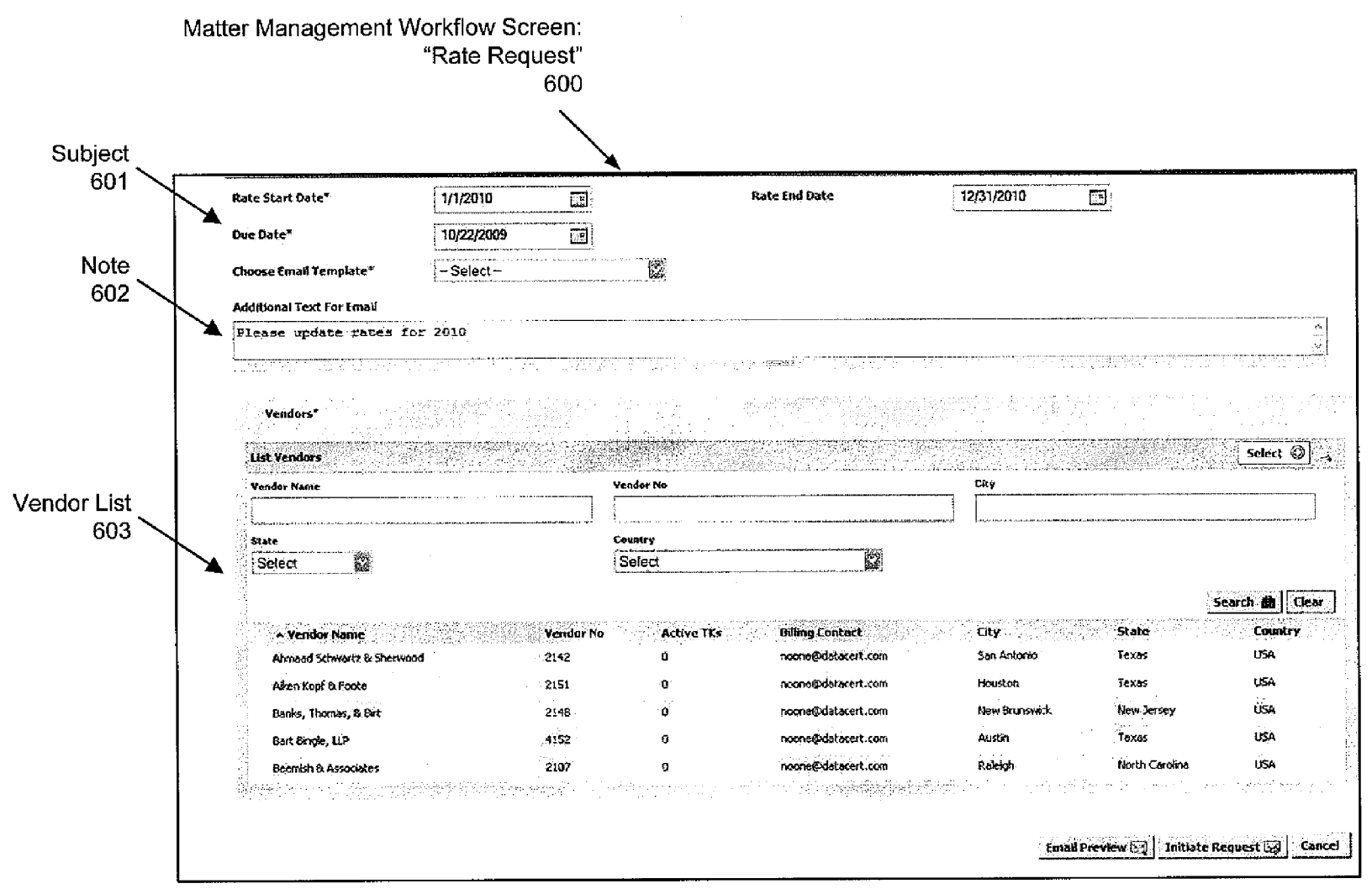

Returning to the discussion of matter management workflow screens, the screen object (105) of the screen (104) may be a data entry field, action button, event, or other object in a screen configuration. The types and other attributes (e.g., designating the data entry field as single line text, multi-line text, pull down menu, date picker, etc. or designating the action button as for predefined data access action or user configurable command) of the screen object (105) may be described by screen and screen object metadata (135b) stored in the repository (131). In one or more embodiments, the screen (104) is automatically generated by the screen generator (107) using the screen and screen object metadata (135b). Example screens and screen objects including various formats of data entry fields and action buttons are shown in FIGS. 3B and 6 below.

In one or more embodiments of the invention, the computer system (101) includes a screen designer UI (103b) configured to present screen designer UI screens (not shown) and receiving corresponding screen designer user input (102b), which may be stored as screen generating metadata (152a) in the repository (131). For example, the screen generating metadata (152a) may include a screen ID (135a), screen a screen object attributes (135b), command attributes (135c), security attributes (135d), and or other attributes (135f). In one or more embodiments, these various attributes or a portion thereof are indexed using the screen ID (135a). In one or more embodiments, the screen designer UI screens allow the screen designer user (not shown) to specify a specific screen (e.g., identified by screen ID (135a)) by selecting from a library (e.g., screen & screen object templates (132)) a screen template and a number of screen object templates to be configured according to the business logic. Subsequently, the matter management workflow user manipulates the screen objects to direct business management data flows following the business logic as embodied in the screen designer specified screens (e.g., screen (104)). For example, if the screen designer wants to control the data required on a next screen in a workflow sequence, he or she can define data entry fields (i.e., screen object) for such screen based on previously entered data. The screen designer user inputs (e.g., screen designer user input (102b)) specifying the aforementioned screen and screen object may then be stored as screen generating metadata (e.g., metadata (152a)) in the metadata store (134).

In addition to the statically defined data entry fields and action buttons that can be included in a screen, user operations (e.g., searching for a matter number meeting certain filtering criteria) specified within the matter management workflow may be saved as reusable commands that can be triggered by an event. Accordingly, the event is detected and associated commands executed by the logic module (109). In one or more embodiments, a screen designer UI screen may be configured to allow the screen designer user to specify and/or save the command and/or the criteria of the event. In one or more embodiments, the criteria of the event may be based on status of a data object or a data item in the matter management data store (136). For example, the status of a data object or a data item may indicated by such terms as creation, editing, copying, deleting, updating, complete, incomplete, etc. Specifically, the complete or incomplete status may refer to data objects having multiple fields associated with multiple screen objects. For example, the data item "employee information of Joe Doe" may have an incomplete status if a birth date field does not have a valid value. For example, the screen designer can determine based on detecting an event (i.e., screen object) of "incomplete data entry" to include a branch from a current screen in the screen sequence to another screen for completing the data entry before returning to the current screen to continue the workflow. The screen designer user inputs (e.g., screen designer user input (102b)) specifying the aforementioned command, event criteria, and screen sequence branch may be stored as additional screen generating metadata (e.g., metadata (152a)) in the metadata store (134). Example screen designer UI screens are shown in FIGS. 3A, 4, 5A, and 5B below.

In one or more embodiments of the invention, the computer system (101) includes a screen generator (107) configured to generate the matter management workflow screens (e.g., screen (104)) using the aforementioned screen generating metadata. In one or more embodiments, the generator (107) is configured to generate low level screen data (e.g., screen data (153a)). For example, the screen generator (107) may obtain screen generating metadata (152b) indexed by a screen ID (135a) from the metadata store (134) to generate the screen (104) that includes screen data (153a) such as in hypertext mark up language (HTML) format passed to the matter management workflow UI (103c) for displaying to the workflow user. In one or more embodiments, the screen generating metadata (152a, 152b) may include the drag, drop, and configuration actions (as recorded and stored) of the screen designer when specifying the screen (104) using the screen designer UI (103b) to select and configure items from the screen and screen object templates (132). Accordingly, the screen generator (107) is configured to mimic such recorded drag, drop, and configuration actions to generate the screen (104), for example in the form of the HTML screen data (153a). In one or more embodiments, the screen generator (107) generates the sequence of screens under the direction of logic module (109) to perform tasks in the matter management workflow in an orderly manner. For example, the sequence of screens may include the aforementioned conditional branch of the screen sequence. In one or more embodiments, the screens (e.g., screen (104)) may be pre-generated and stored for later use by the logic module (109). In one or more embodiments, the screens (e.g., screen (104)) may be generated on demand as requested by the logic module (109).

In one or more embodiments of the invention, the computer system (101) includes a screen tester UI (103a) configured to present screen tester UI screens (not shown) and receiving corresponding screen tester user input (102a), which may be stored as test instruction (e.g., test instruction (151)) for use later by test sequence generator (106) or used in real time by test sequence generator (106) to generate a test sequence. The test instruction and/or test sequence (132) are stored in the repository (131). In one or more embodiments of the invention, the test instruction may be specified in a test instruction specification language based on a syntax of a list of elements (verb: item(s)) where each item is a screen object. In such embodiments, the screen tester UI screens may allow the screen tester user to construct a stimulus test vector in the test instruction of a screen (e.g., screen (104)) by including a combination of a verb (e.g., click, fill, etc.) and a screen object (e.g., screen object (105)) of a screen (104). Typically, the test instruction of a screen (e.g., screen (104)) includes a sequence of such stimulus test vectors mimicking a human user performing a workflow task traversing a sequence of screen objects.

In one or more embodiments, the test instruction specification language syntax may include a list of elements (verb: item(s)) where each item is a data item in the matter management data store (136) associated with a screen object (e.g., screen object (105)). In such embodiments, the data item may be a workflow user input received via the screen object (e.g., screen object (105)) or a derived data based on such workflow user input. For example, the screen tester UI screens may allow the screen tester user to construct a verification test vector in the test instruction of a screen (e.g., screen (104)) by including a combination of a verb (e.g., verify, etc.) and a workflow data item associated with a screen object (e.g., screen object (105) of screen (104)). Typically, the test instruction of a screen (e.g., screen (104)) includes a sequence of such verification test vectors mimicking a human user verifying a workflow data item that may be affected by the simulated workflow task during the application of the stimulus test vector. Example screen tester UI screens are shown in FIGS. 8A-9C below.

In one or more embodiments of the invention, the computer system (101) includes a test sequence generator (106) configured to generate a test sequence from the aforementioned test instruction. In one or more embodiments, the test sequence generator (106) is called upon via the screen tester UI to convert each of the aforementioned elements (verb: item(s)) into a test sequence that operates at the metadata level.

For example, when the test sequence corresponding to a stimulus test vector of a test instruction is applied to a screen, the test sequence generator (106) interprets the verb (e.g., click, fill, etc.) and the screen object (e.g., screen object (105)) of the stimulus vector and then applies the verb action to the screen object. In one or more embodiments, interpreting the screen object (e.g., screen object (105)) and applying the verb action is based on the screen generating metadata associated with the screen object. As described above, the test instruction typically mimics a human user performing a workflow task traversing a sequence of screen objects. Accordingly, the application of the test instruction using the test sequence generator (106) simulates the human user's actions navigating the matter management workflow.

Similarly, when the test sequence corresponding to a verification test vector of a test instruction is applied to a screen, the test sequence generator (106) interprets the verb (e.g., verify, etc.) and the screen object (e.g., screen object (105)) associated data item of the verification test vector and then applies the verb action to the data item retrieved for inspection from the matter management data store. In one or more embodiments, interpreting the screen object (e.g., screen object (105)) and applying the verb action includes accessing (e.g., retrieving) the data item based on (e.g., indexed by) the metadata of the associated screen object. As described above, the test instruction typically mimics a human user verifying a workflow data item. Accordingly, the application of the test instruction using the test sequence generator (106) also simulates the human user's actions verifying the matter management workflow results.

In the embodiment described above, the test sequence generator (106) is used in an interpreter configuration that generates the test sequence on demand as the test instruction is applied. In one or more embodiments, the test sequence generator (106) may also be used in a compiler mode to generate test sequences for storing to be used at a later time.

In one or more embodiments of the invention, the test sequence generator (106) may be used for regression testing when the screen designer user modifies workflow screens. For example, the screen modification may involve only appearance or layout changes and the test instruction may stay unchanged to detect possible violation to the business logic as a result of such screen modification. In another example, the test instruction may be modified to reflect an adjustment in the business logic consistent with the screen modification, for example instituted to expand compatibility with collaborating entities. Specifically, the test instruction may be modified via the screen tester UI (103a).

In one or more embodiments of the invention, the computer system (101) may be configured as a server computer in a client server environment. In such embodiments, a matter management workflow UI (103c) may include a web browser may executing on a matter management user device (i.e., a client portion of the computer system (101)) configured to display the workflow screens. Further, the screen tester UI (103a) may be configured to interface with a web testing application (not shown) using which to apply the test sequence to and to retrieve a resultant screen content from the screen displayed on the matter management user device.

In one or more embodiments of the invention, the screen designer UI (103b), the screen generator (107), the screen tester UI (103a), the test sequence generator (106), or a portion thereof may be a stand alone module in communication with the logic module (109), a user installable add-on module of the logic module (109), an optional functional module within the logic module (109), or a standard feature built-in within the logic module (109). In one or more embodiments of the invention, the screen designer UI (103b), the screen generator (107), the screen tester UI (103a), the test sequence generator (106), or a portion thereof may be provided by a provider of the logic module (109) or by a third party separate from the provider of the logic module (109) based on an application programming interface. In one or more embodiments of the invention, the aforementioned module(s) may be implemented using software, hardware, or combinations thereof.

In one or more embodiments of the invention, the computer system (101) includes a remote device interface (108) that maintains security integrity while allowing a portion of the matter management workflow screens (e.g., remote screen (123)) to be generated remotely at the remote computer system (121). For example, a portion of screen generating metadata (e.g., metadata (152c)) used by the computer system (101) may be allowed (based on data level security attributes (135d)) to be sent as remote metadata (152d) to a remote screen generator (125) for generating the remote screen (123) having remote screen objects (124). Similar to the configuration of the computer system (101), the remote computer system (121) includes a matter management workflow remote UI (122) for presenting remote screens (e.g., remote screen (123)) to a remote user (not shown) and receiving remote user input (125), which is transmitted to and processed by the logic module (109) to navigate a portion of the matter management workflow designated for remote device collaboration and allow the remote user to perform necessary tasks conforming to the business logic of the computer system (101). For example, the remote screen (123) may include screen data (153b) such as in hypertext mark up language (HTML) format that is passed to the matter management workflow UI (103c) for display to the remote user. Example remote screens are shown in FIGS. 7A and 7B below.

In one or more embodiments of the invention, the remote computer system (120) may be configured as a client server environment including separate client and server portions. In one or more embodiments, the matter management workflow remote UI (122) may be executing on a remote matter management workflow user device (i.e., the client portion) while the remote screen generator (125) may be executing on a third party server (i.e., the server portion) operated by an application service provider which may be the same provider of the screen designer UI (103b), the screen generator (107), the screen tester UI (103a), the test sequence generator (106), or a portion thereof. In such embodiments, the remote metadata (152d) is retained within the third party server without being exposed to the remote management workflow user device for added security. For example, the remote management workflow user device only receives HTML screen data (153b).

Figure 1B:
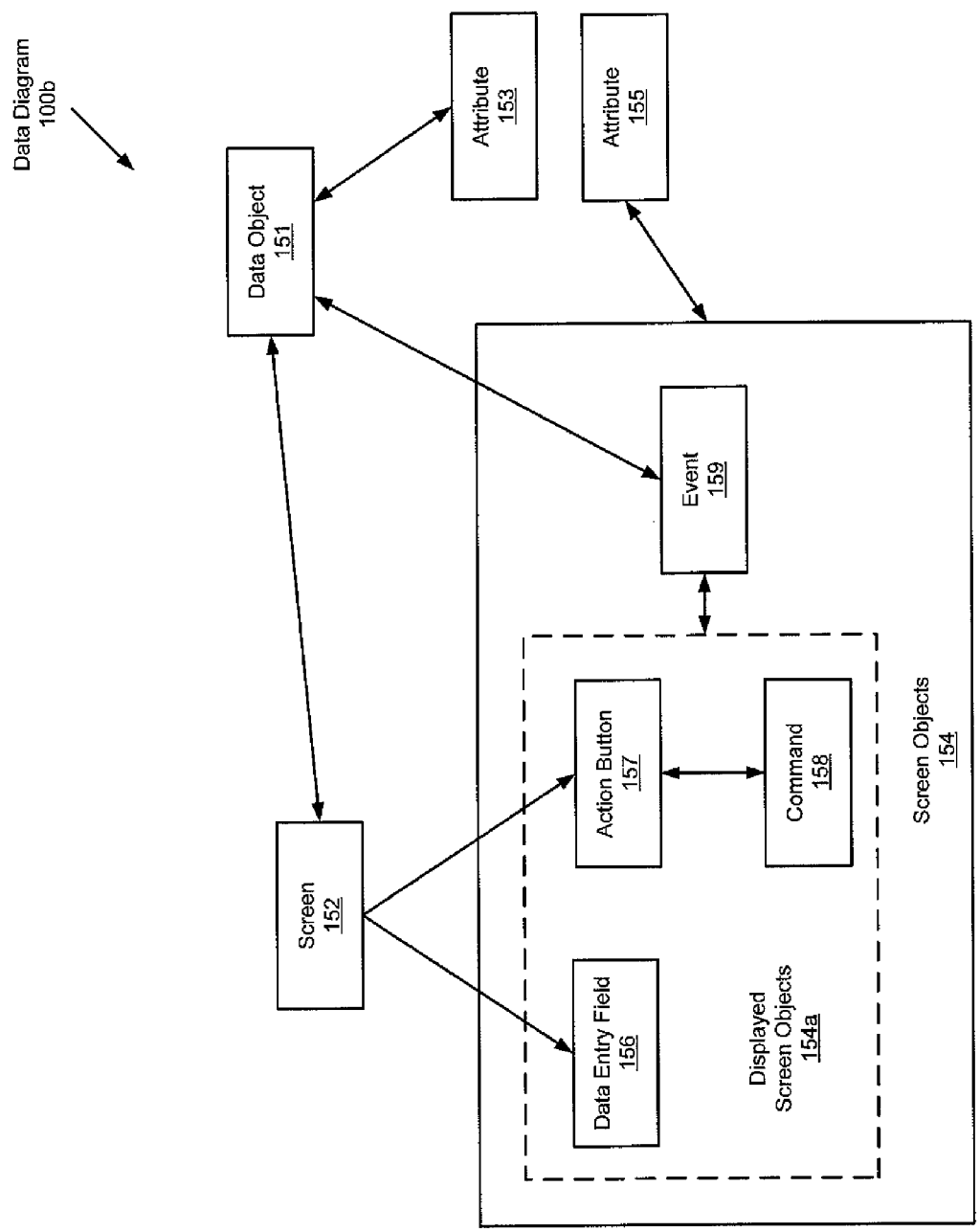
FIG. 1B depicts a schematic block diagram of data and metadata organization in accordance with one or more embodiments of the invention.

FIG. 1B depicts a schematic block diagram (100b) of data and metadata organization in accordance with one or more embodiments of the invention. In one or more embodiments of the invention, one or more of the modules and elements shown in FIG. 1B may be omitted, repeated, and/or substituted. Accordingly, embodiments of the invention should not be considered limited to the specific arrangements of modules shown in FIG. 1B.

As shown in FIG. 1B, data diagram (100b) includes a data object (151) with an associated screen (152) having screen objects (154). In addition, the data object (151) is linked with one attribute (e.g., attribute (153)) while the screen objects (154) are linked with another attribute (e.g., attribute (155)). Further, the screen objects (154) include the displayed screen objects (154a), such as a data entry field (156), an action button (157), and a command (158). In addition, the screen objects (154) also include non-displayed object such as an event (159).

Figure 5A:
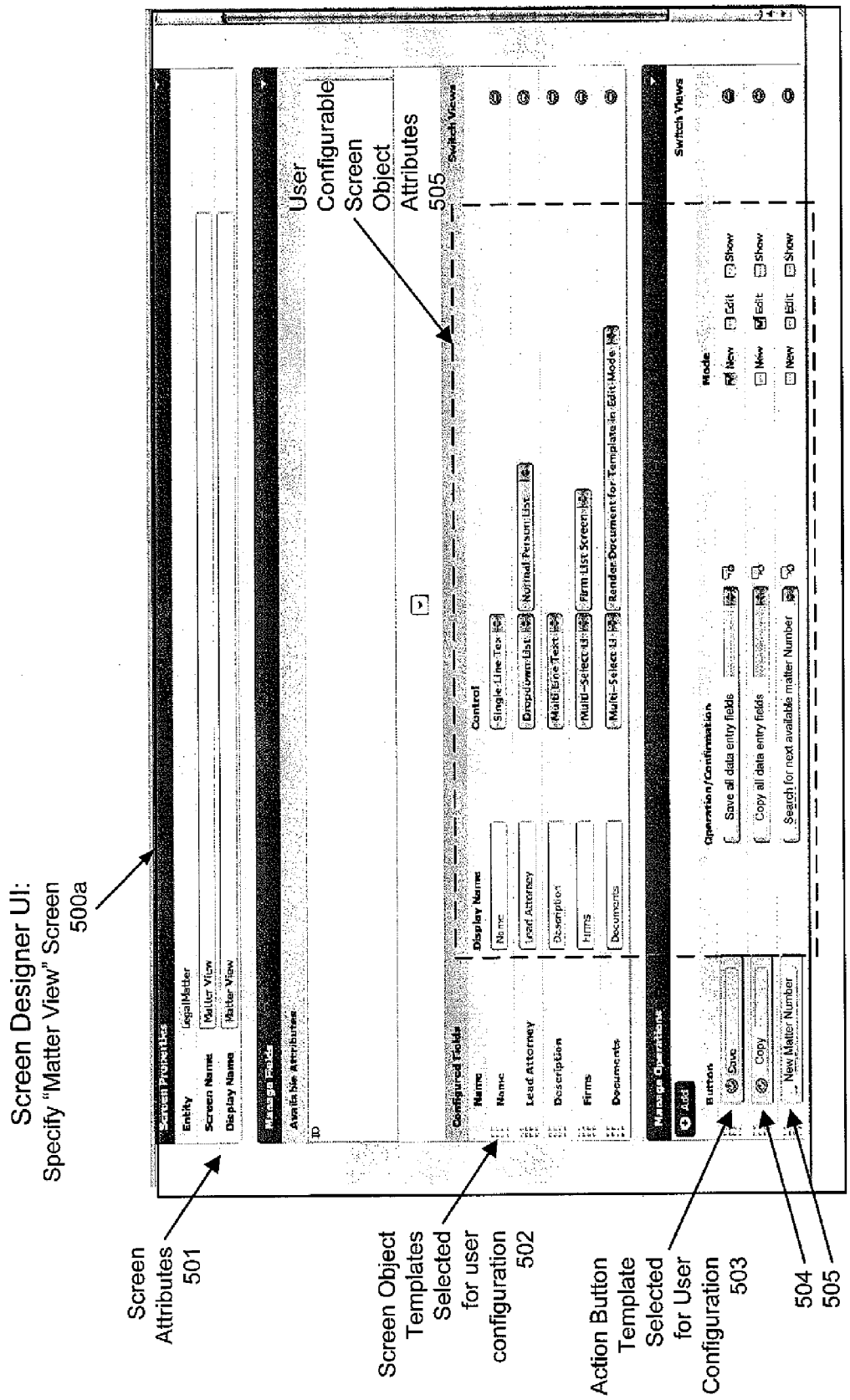

In one or more embodiments of the inventions, matter management workflow data (e.g., lists of attorneys and other workers assigned the case, types of legal work, pending and resolved issues, documents, budgets, invoices, time keeping and billing information, opened and closed matters, deadlines and dockets, litigation support information (e.g., witnesses, judges, courts, opposing counsels, etc.), conflicts and ethics control parameters, etc.) are represented as a data object (151)

or instantiations thereof and stored in the matter management data store (136). Detail aspects (e.g., data type, access authority, etc.) of matter management workflow data may be stored as an attribute (153) linked thereto. For example, a datetime field uses a date and time calendar control, a text field uses a text box, etc. In one or more embodiments, the data object (151) and the attribute (153) are stored together in the matter management data store (136). An example screen designer UI for specifying a screen to define and/or instantiate data object (151) is shown in FIG. 5A below.

In one or more embodiments of the invention, the aforementioned matter management workflow data are managed/tracked using a screen (152) composed of screen objects (154), which are essentially the same as the screen (104) and the screen objects (105) described in reference to FIG. 1A above. Generally, the screen (152) includes data entry fields (e.g., data entry field (156)) and action buttons (e.g., action button (157)) that are displayed. Further, a sequence of action buttons may be pre-defined or user defined as a command (e.g., command (158)) as an additional item in the displayed screen objects (154a). Detail aspects (e.g., format, position, control, etc.) of displayed screen objects (154a) are stored as attribute (153), which may include screen and screen object attributes (135b), command attributes (135c), security attributes (135d), and/or other attributes (135f) described in reference to FIG. 1A above.

Figure 5B:
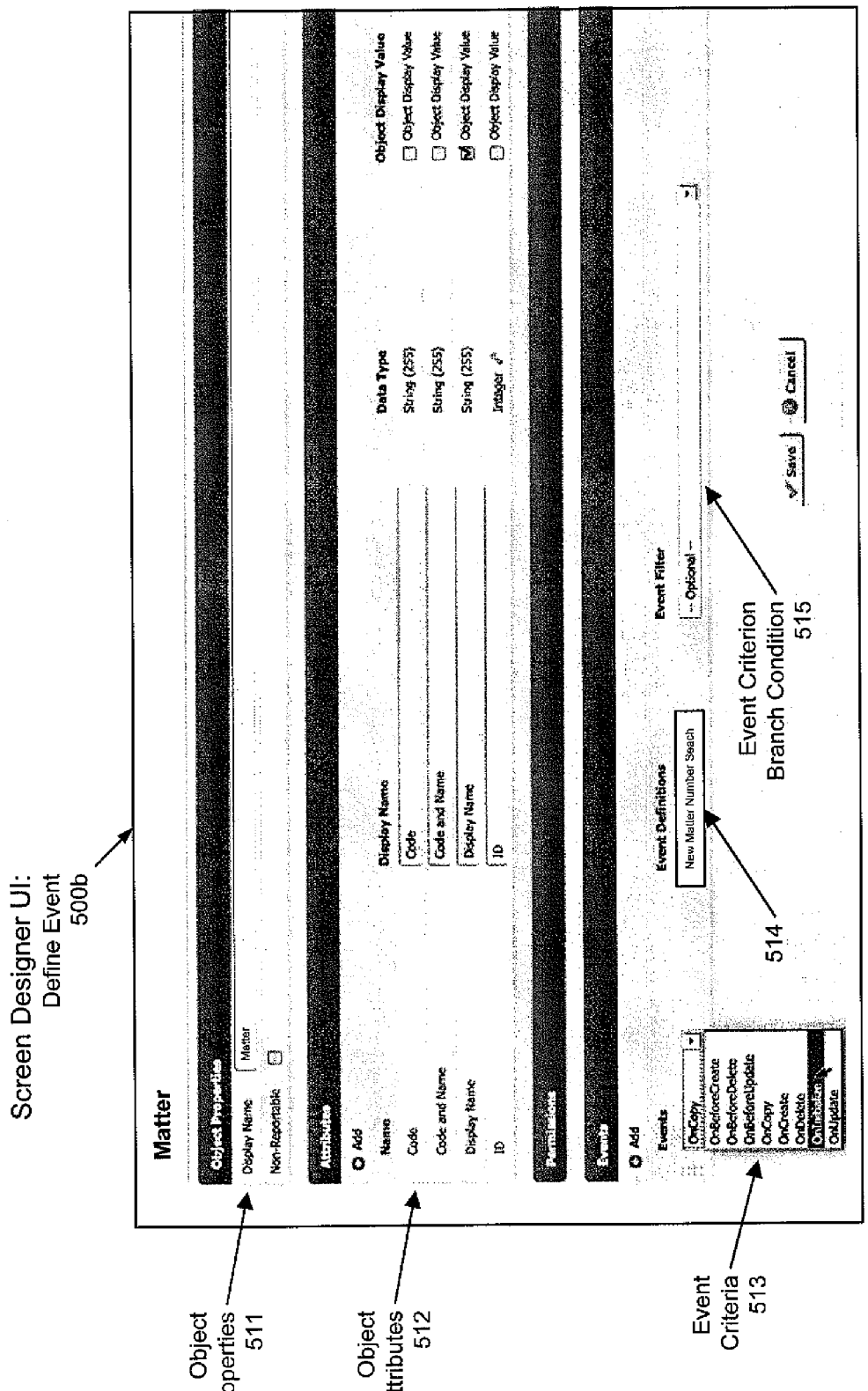

Further as shown in FIG. 1B, screen objects (154) may include an event (159), which is a non-displayed screen object. In one or more embodiments of the inventions, the event (159) includes a pre-defined criterion specifying a status of the aforementioned matter management workflow data. For example, the event (159) may be defined based on one or more data object (e.g., data object (151)) to represent creating, deleting, updating, copying, etc. of one or more of matter management data item. In one or more embodiments, the display of data entry field (156), action button (157), and command (158) in the screen (152) may be conditioned (i.e., filtered) based on the event (159). For example, one or more of the data displayed screen objects (154a) may be hidden or shown in the screen (152) in response to detecting an occurrence of the event (159) during the course of matter management workflow. An example of defining an event is shown in FIG. 5B below.

Figure 2:
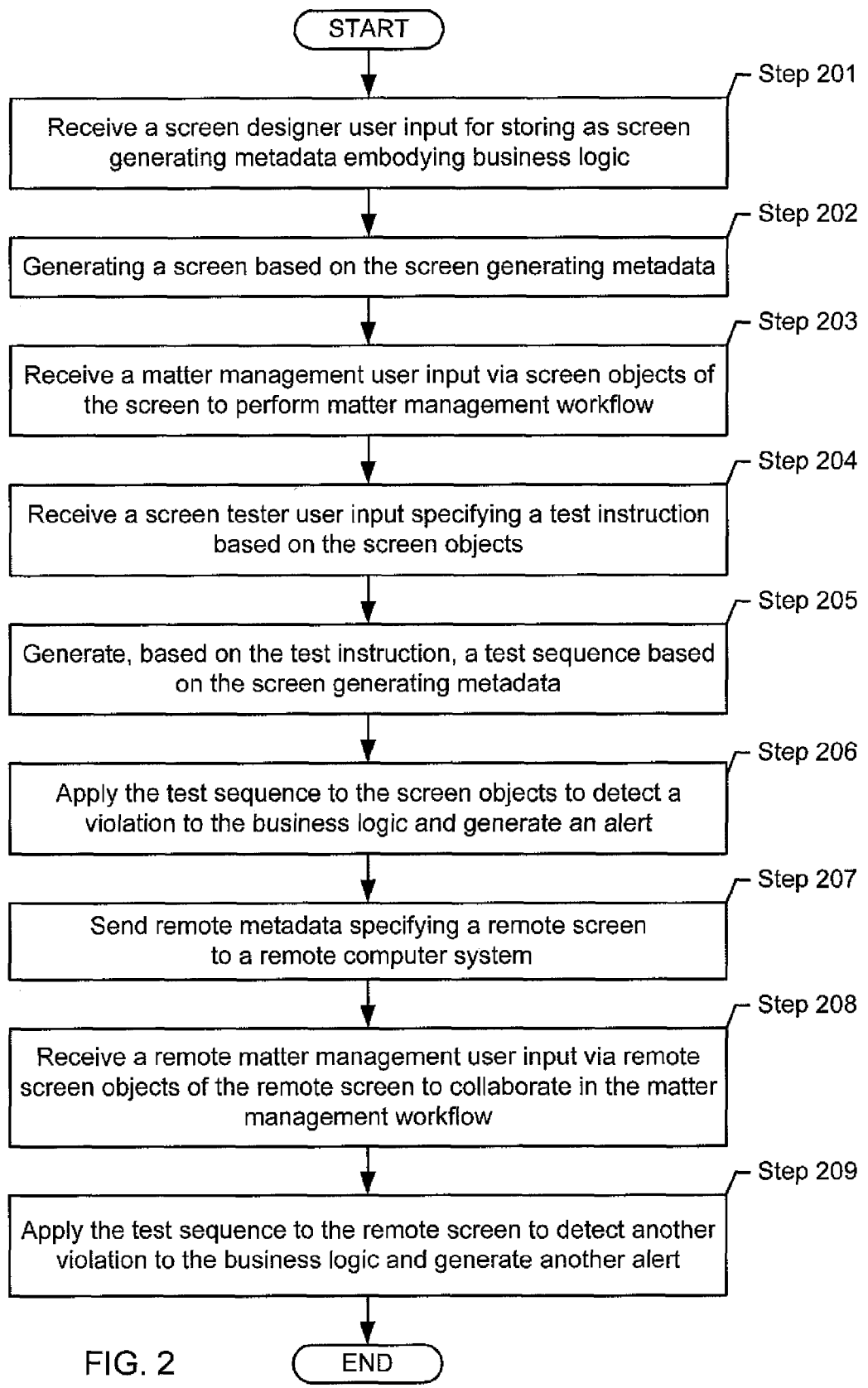
FIG. 2 depicts a flowchart of a method in accordance with one or more embodiments of the invention.

FIG. 2 depicts flowcharts of methods in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2.

The method as shown in FIG. 2 may be practiced using system (100a) described with respect to FIG. 1A above. For example, a corporate entry level clerk in accounting department may use matter management workflow screens to complete business tasks where the workflow screens are specified and tested by a corporate IT specialist (e.g., experienced in the corporate business logic) based on shared screen generating metadata. Further, an outside law firm entry level clerk in the billing department may access a portion of this corporate client's matter management workflow screens released for collaboration. In particular, the matter management workflow UI and the matter management workflow remote UI are tailored to users of all experience levels while the screen designer UI and screen tester UI are configured separately from the matter management workflow UI and with advanced capability for use by a user having advance training and experience level. Accordingly, the corporate entry level clerk and the outside law firm entry level clerk can collaborate on billing tasks in compliance with the business logic embodied in the workflow screens by the corporate IT specialist.

Initially in Step 201, a screen designer user input is received from a screen designer user. In one or more embodiments of the invention, the screen designer user input is received via screen designer UI, which may include a set of GUI screens specifically configured for screen designer and are separate from the GUI screens of the matter management workflow. For example, the screen designer UI may require different access authorization (e.g., login account user name and password) than those for accessing the matter management workflow. In another example, the screen designer UI may be included in a different module of the software application or in an entirely different software application than the matter management workflow software application.

In one or more embodiments, the screen designer user input is based on the business logic to identify a number of screen objects (e.g., data entry fields, action buttons, events, etc.) and include attributes of such screen objects. For example, the screen designer may first select a screen template from a screen template library as starting point for specifying the screen. Then, screen objects may be selected by the screen designer from a screen object template library, drag-and-dropped onto the selected screen template, each screen object configured by manual entry or using associated attribute selection menu to complete the screen specification. In one or more embodiments, the screen designer inputs of such selection, drag-and-dropping, attribute configuration, etc. are stored as metadata (i.e., screen generating metadata).

An example screen object is a data entry field and the attributes may include a designation of the data entry field as a single line text field, multi-line text field, drop down menu, etc. Another example of a data entry field is an action button and the attributes may include a designation of the action button for activating a pre-defined action or a user defined action. For example, the pre-defined action button may activate an action to access (e.g., the action to open, get, close, copy, update, store, add, delete, modify, create, save, etc.) a data store of the matter management workflow based on content of the data entry field. As described above, the user defined action button may be a saved command (e.g., based on a sequence of screens and action buttons) having functionality to access the data store to complete a particular task or sub-task of the workflow. In addition to be activated based on user click on the action button, the saved command may also be activated when a particular event is detected during the course of performing the matter management workflow. An event may be associated with a screen thus considered as a screen object whose attributes may include the criteria defining the event such as a status of a data object related to the screen. For example, an event may be defined as when a data object is created using a screen or values of the data object are incompletely entered when exiting the screen. In one or more embodiments, the screen designer inputs to specify such user defined command, event, and attributes thereof are also stored as screen generating metadata. Example screen designer UI screens are shown in FIGS. 3A, 4, 5A, and 5B below.

In Step 202, a matter management workflow screen is generated. In one or more embodiments of the invention, a logic module of the workflow uses a screen generator to generate the screen automatically from corresponding metadata. Specifically, the logic module may obtain, and provide to the screen generator, metadata specifying the screen based on the business logic. Accordingly, the screen is generated and displayed to the matter management workflow user (e.g., an accounting clerk) to perform one or more tasks of the matter management workflow.

In Step 203, the matter management user input is received via screen objects of the automatically generated screen and used by the logic module to perform the matter management workflow. As described above, the logic module may use the received user input to track and maintain matter management data (e.g., lists of attorneys and other workers assigned the case, types of legal work, pending and resolved issues, documents, budgets, invoices, time keeping and billing information, opened and closed matters, deadlines and dockets, litigation support information (e.g., witnesses, judges, courts, opposing counsels, etc.), conflicts and ethics control parameters, etc.) stored in a matter management data store. Such data may be organized as data objects having attributes linking to related screens and screen generating metadata. For example, information of an attorney may be linked to a particular workflow screen from which the information is entered.

In one or more embodiments, the screen is generated based on the metadata on demand while the logic module request the screen to be displayed. In one or more embodiments, the screen is pre-generated based on the metadata and stored for use by the logic module when the screen needs to be displayed. Generally, the logic module directs the screens to be displayed in a sequence allowing screen objects to be engaged for user interaction in an orderly manner. In one or more embodiments, the logic module also monitors and detects an event based on pre-determined event criteria to activate saved command linked to the event. For example, the event may be detected by monitoring a status or status change in the data store based on the event criteria. Example screens and screen objects including various formats of data entry fields and action buttons are shown in FIGS. 3B and 6 below.

In Step 204, a screen tester user input is received from a screen tester user. In one or more embodiments of the invention, the screen tester user input is received via screen tester UI, which may include a set of GUI screens specifically configured for screen tester and are separate from the GUI screens of the matter management workflow. For example, the screen tester UI may require different access authorization (e.g., login account user name and password) than those for accessing the matter management workflow. In another example, the screen tester UI may be included in a different module of the software application or in an entirely different software application than the matter management workflow software application.

In one or more embodiments, the screen tester user input is based on the business logic to specify a test instruction. In one or more embodiments, the test instruction may include a specification based on the screen objects of a screen under test. For example, a stimulus portion of the test instruction may mimic user interaction with the screen objects in entering data or clicking on action button. The verification portion of the test instruction may mimic user inspection of data items related to the screen objects that may be affected by the stimulus portion of the test instruction. In addition, the verification portion of the test instruction may include monitoring and detecting specified events to trigger linked commands accordingly. Both the stimulus and verification portion of the test instruction may be specified using example test instruction specification language and example syntax described in reference to FIG. 1A above. Example screen tester UI screens are shown in FIGS. 8A-9C below.

In Step 205, a test sequence is automatically generated without user intervention based on the test instruction. In one or more embodiments, the test sequence includes a specification based on the metadata of the screen objects in the test instruction. In one or more embodiments, the test sequence is generated using a test sequence generator that is configured to interpret/parse the test instruction specification language and syntax to carry out the test instruction as described in reference to FIG. 1A above.

In Step 206, the test sequence is applied to the screen objects of the screen under test to generate a result representing an evaluation of performing the matter management workflow according to the business logic. As noted above, the test sequence not only mimics user navigating the matter management workflow and inspecting potentially effected workflow data, executing the test sequence also put in motion mechanisms to monitor and detect specified events such that the workflow test condition is properly simulated including the event triggered commands. When the test result indicates a violation to the business logic according to the verification stimulus test vector, an alert is generated.

In one or more embodiments, the screen tester user may perform a regression testing following a screen modification based on a screen designer user input modifying the screen generating metadata. In an example regression testing where the screen modification only changes screen appearance or screen object layout, the test sequence is applied without change to the modified screen to generate a result possibly identifying a violation to the business logic if the screen modification caused an unexpected effect. In another example regression testing where the screen is modified as a result of business logic adjustment to address a new requirement, the test instruction is adjusted accordingly and new test sequence generated automatically before being applied to the modified screen to generate a result possibly identifying a violation to the business logic if the screen modification caused an unexpected effect.

In Step 207, a portion of metadata designated for collaboration outside a corporate firewall may be sent as remote metadata to a remote computer system. In one or more embodiments of the invention, security attributes of each screen generating metadata is inspected on a data record basis for releasing across the corporate firewall. In one or more embodiments, the remote metadata specifies a remote screen based on applicable collaboration portion of the business logic allowing a user outside of the business entity to collaborate in the matter management workflow. Accordingly, the remote screen is generated and displayed to such outside collaborating user.

In Step 208, a remote matter management user input is received via remote screen objects of the remote screen as specified by the remote metadata. In one or more embodiments of the invention, the remote data is delivered to the remote computer system in a security container selectively accessible based on data level security attribute. In one or more embodiments, the remote data is selectively delivered to the remote computer system passing the security check at the corporate firewall border based on data level security attribute. Based on the collaboration portion of the workflow, such remote user input or derived data thereof is passed to the logic module within the corporate firewall to complete one or more collaborating tasks of the workflow. Example remote screens are shown in FIGS. 7A and 7B below.

In Step 209, a test instruction of the collaboration remote screen is applied to the remote screen across the corporate firewall. In one or more embodiments of the invention, screen generating metadata included in each of the test sequences of the test instruction is delivered along with the test instruction in a security container to the remote computer system accessible based on data level security attribute. In one or more embodiments, screen generating metadata included in each of the test sequences of the test instruction is inspected based on data level security attribute at the corporate firewall border for releasing to the remote computer system. In particular, the security attributes of the remote screen objects and applicable test instruction are specified consistently such that any remote screen generated outside of the corporate firewall is testable by corresponding test sequences. Said in other words, the scenario that remote metadata generating a remote screen and remote metadata specified within a test sequence for the remote screen are assigned consistent security attributes. In one or more embodiments, applying the remote test instruction causes a remote screen to be displayed on the remote computer system where resultant screen data are retrieved (e.g., using screen scraping techniques) and used for verification.

In one or more embodiments, the computer system executing the logic module to perform the matter management workflow and the remote computer system executing the collaboration portion of the workflow may, either individually or in combination, include a client server configuration. In such embodiments, the screen or remote screen may be displayed using a web browser on a matter management user device (i.e., client device or remoter client device). Accordingly, applying the test sequence includes steps of (1) sending the test sequence to a web testing application for applying to the screen displayed on the matter management user device, (2) retrieving resultant screen content from the matter management user device using the web testing application, and (3) verifying the screen content or workflow data related thereto based on the test sequence to generate the evaluation.

FIGS. 3A-9C depict screenshots of examples of a matter management workflow in accordance with one or more embodiments of the invention. Specifically, FIGS. 3A-5B depict screen generation of the matter management workflow, FIGS. 6-7B depict collaboration in the matter management workflow, and FIGS. 8A-9C depict screen testing for the matter management workflow.

Figure 3A:
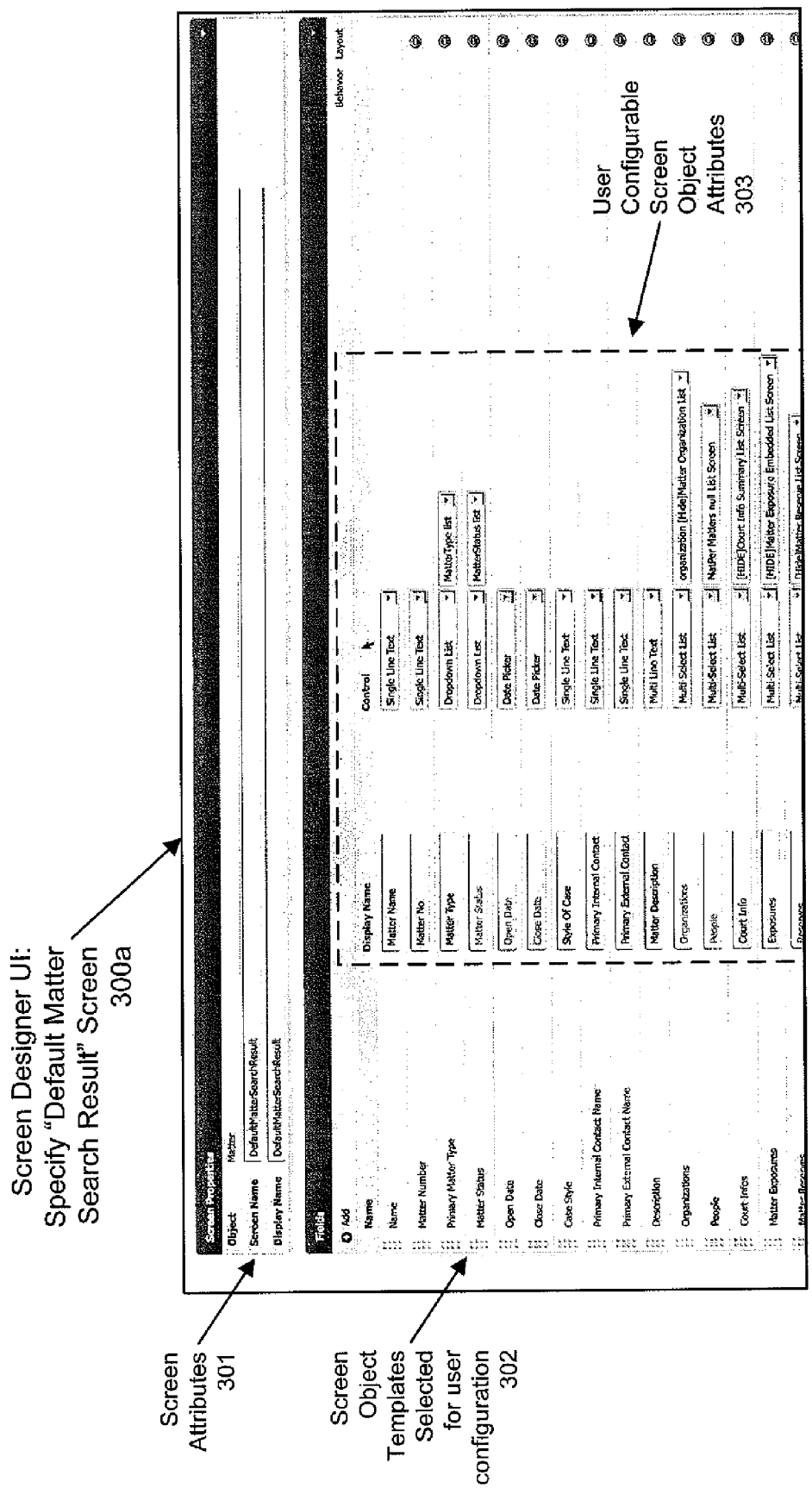
Figure 3B:
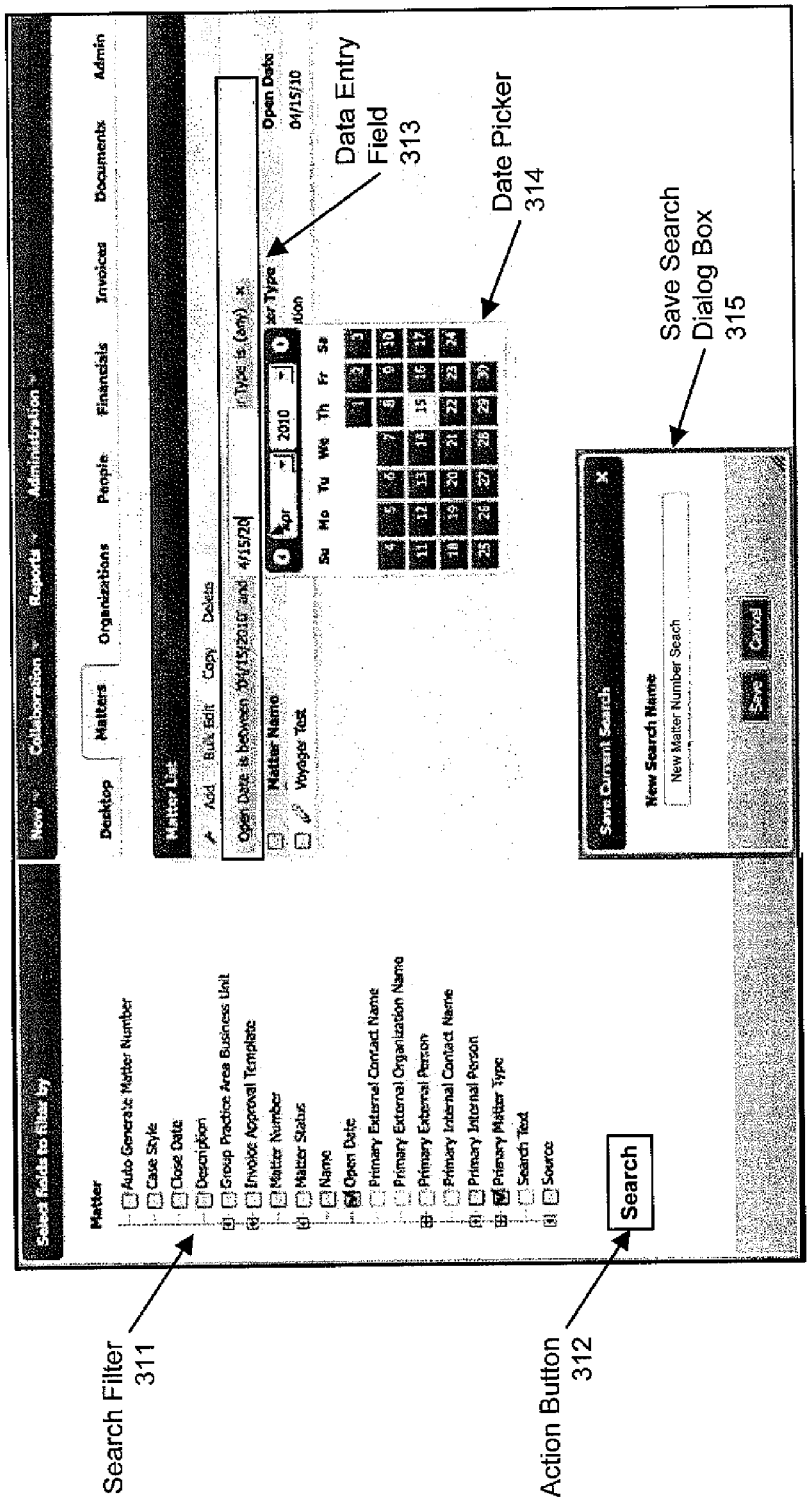

FIG. 3A shows a screenshot (300a) of a screen designer UI used for a screen designer user to specify a matter management workflow screen "Default Matter Search Result." As shown in FIG. 3, the screenshot (300) includes a section (301) for the screen designer user to specify screen attributes and a section (302) for the screen designer user to specify screen objects. For example, the screen designer user can select screen object templates from a library (not shown) for including (e.g., drag and place) in the section (302). In the example shown in FIG. 3A, the screen is named "Default Matter Search Result" by the screen designer and is associated with the "matter" object of the matter management data. As noted above, the matter management data may be stored in an object oriented database where object is a data construct. In addition, each of the selected screen object templates (e.g., name, matter number, priority matter type, matter status, open date, close date, close style, primary internal contact name, primary external contact name, description, organizations, people, court information, matter exposure, matter resources, etc.) in section (302) is associated with corresponding screen object attributes depicted in section (303) including user (i.e., screen designer user) specified display name (i.e., a screen object attribute) and user selected format (i.e., another screen object attribute). The display name is used for displaying in the "Default Matter Search Result" screen. The user selected format designates different types (e.g., single line text, multi-line text, drop down list, date picker, matter organization list, etc.) of screen object depending how matter management workflow user's input will be received in the "Default Matter Search Result." As noted above, inputs (e.g., screen attributes, selected screen object templates, and screen object attributes) entered by the screen designer user into the sections (301) and (302) of the screen designer UI, as depicted in the screenshot (300a), may be stored as screen generating metadata that is subsequently used to automatically generate the matter management workflow screen "Default Matter Search Result" as needed when a user performs the matter management workflow.

FIG. 3B shows a screenshot (300b) depicting the use of the automatically generated matter management workflow screen "Default Matter Search Result." As shown, the "Default Matter Search Result" screen includes (1) section (311) showing a number of search filter check boxes (i.e., screen objects) for receiving matter management workflow user selections, (2) action button (i.e., screen object) (312) to initiate the search using the selected search filters "open date" and "primary matter type", (3) data entry field (i.e., screen object) (313) for receiving matter management workflow user input parameters related to the selected search filters "open date" and "primary matter type", (4) date picker (i.e., screen object) (314) for assisting matter management workflow user to enter the search filter parameter for "open date", and (5) dialog box (i.e., screen object) (315) for allowing the matter management workflow user to save the search function specified above. For example, a particular search defined by the matter management workflow user using the "Default Matter Search" screen may be saved as a macro or a command (e.g., named as "new matter number search") for reuse (e.g., the command may be activated via an action button in another matter management workflow screen.)

As shown in FIGS. 3A and 3B, search filter check boxes in section (311) are previously specified by the screen designer as depicted in the screenshot (300a). Although not specifically shown, other screen objects of the matter management workflow screen "Default Matter Search Result" depicted in screenshot (300b) may be specified by inputs from the screen designer user using other screen designer UI not shown in the screenshot (300a) of FIG. 3A above. These additional screen designer user input may also be stored as screen generating metadata to further generate the matter management workflow screen "Default Matter Search Result."

Figure 4:
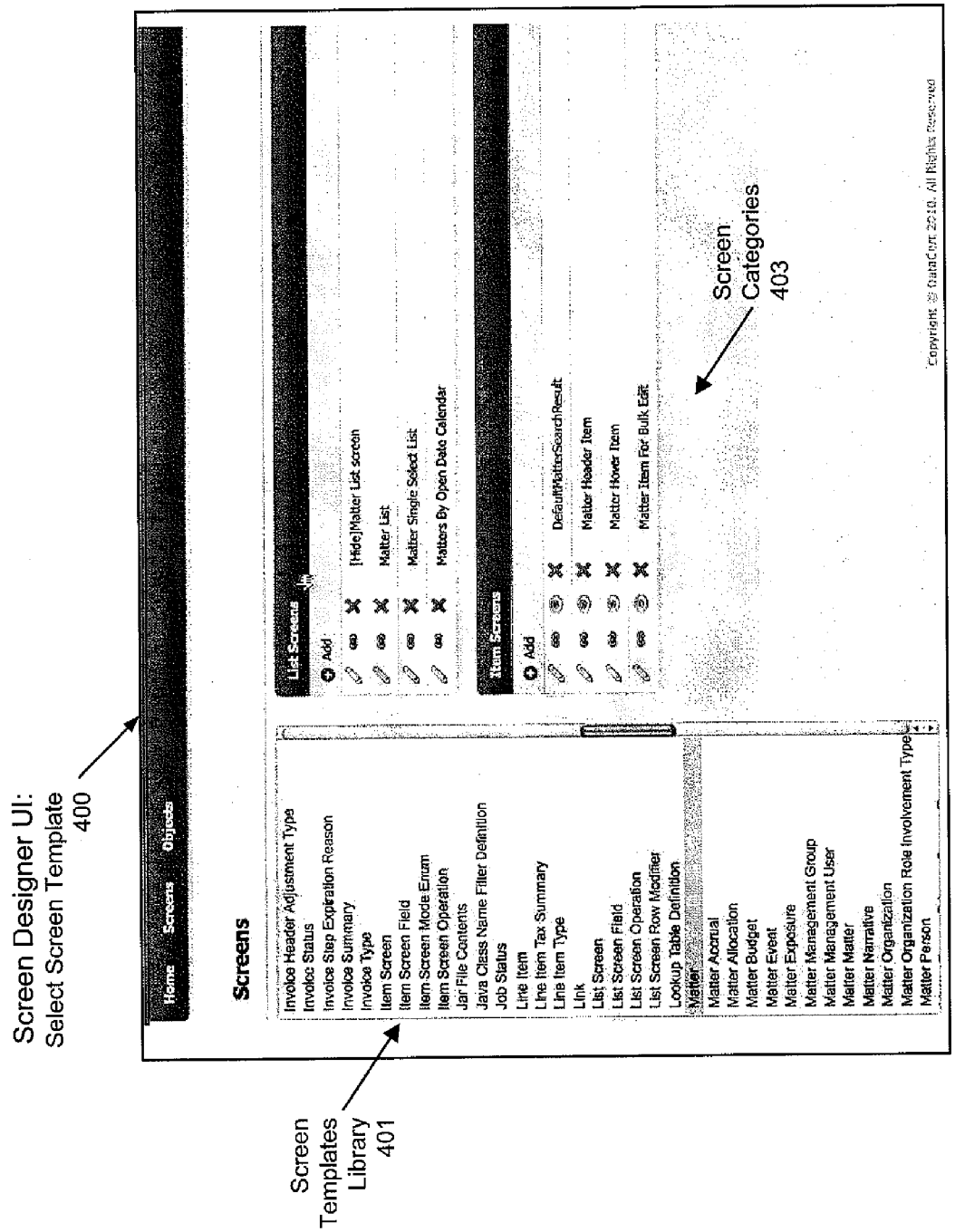

FIG. 4 shows a screenshot (400) of a screen designer UI allowing the screen designer user to select a screen template from the screen template library (401) as a starting point for specifying a matter management workflow screen without building it from scratch. As shown, the screen template library (401) includes various screen templates such as invoice header adjustment type screen, invoice status screen, invoice step expiration reason screen, invoice summary screen, invoice type screen, job status screen, line item screen, line item tax summary screen, matter screen, matter accrual screen, matter allocation screen, matter budget screen, matter event screen, matter exposure screen, etc. In addition, a screen may be a list screen (e.g., relating to a list of matters) or an item screen (e.g., relating to a single matter), which may be specified by the screen designer user using section (403) for screen category selection. Other attributes of the screen may be further selected to customize the screen from the selected screen template. As described above, such inputs from the screen designer user may be stored as screen generating metadata.

FIG. 5A shows a screenshot (500a) of a screen designer UI used for a screen designer user to specify a data object "matter" using matter management workflow screen "Matter View." As described above, the data object "matter" and instantiated data items may be stored in matter management data store. Similar to the screenshot (300a) shown in FIG. 3, the screenshot (500a) includes a section (501) for the screen designer user to specify screen attributes and a section (502) for the screen designer user to specify screen objects. In the example shown in FIG. 5A, the screen is named as "Matter View" by the screen designer and is associated with the "legal matter" type of the matter management data. For example, "legal matter" is an attribute of the data object "matter" in the matter management data stored in an object oriented database. In addition, action buttons may be selected from screen object templates in a library (not shown) for user configuration using this screen designer UI depicted in screenshot (500a). Similar to the screenshot (300a), each screen object template selected into section (502) is associated with corresponding screen object attributes in section (505). As shown, the action button template (503) is named "save" and is configured to perform the operation "saving all data entry fields" in a mode "new." In addition, the action button template (503) is named "copy" and is configured to perform the operation "copying all data entry fields" in a mode "edit" (i.e., data fields are available for editing after being copied, which may be used to create a new matter using the "matter view" screen as a starting point). Typically, the action button templates (503) and (504) may be used generically without customization. In a different manner, the action button template (505) is named by the screen designer user as "new matter number" and is configured to perform the operation "search for the next available matter number" described above in reference to FIG. 3B. Here, the previously saved command is reused here to be activated by an action button custom configured (i.e., customized) from the action button template (504). Accordingly, this automatically searched new matter number may be assigned to the new matter copied and edited using the "matter view" screen as a starting point. As described above, such inputs from the screen designer user to configure the action button attributes may be stored as screen generating metadata.

FIG. 5B shows screenshot (500b) of a screen designer UI used for a screen designer user to specify an event in terms of a pre-determined criterion when met causes a specified command (e.g., the aforementioned command "new matter number search") to be activated as a part of performing the matter management workflow. As shown in the screenshot (500b), a matter management workflow data object (which may be different than a screen object) "matter" has been defined with object properties (511) and object attributes (512). For example, the data object "matter" may include a user defined method specified here using the data entry field (514) (e.g., a single/multi-line text or a pull down selection menu) as the aforementioned "new matter number search" command. In addition, a pull down menu (513) allows the screen designer user to specify a criterion with respect to the data object "matter." As shown, the criterion may be defined as any of "on and before creating" the data object "matter", "on and before deleting" the data object "matter", "on and before updating" the data object "matter", "on copying" the data object "matter", "on creating" the data object "matter", "on deleting" the data object "matter", "on initializing" the data object "matter", "on updating" the data object "matter", etc. Further, the criterion may include conditional branch based on filter specification (515). In particular, the event may be defined to activate the aforementioned "new matter number search" command on initializing the data object "matter." Accordingly, the new matter number obtained by executing this command may be used in completing the initialization of a new data object "matter." Although the screen designer user input depicted here is not used to directly generate visible portion of a matter management workflow screen, the event criterion described above is embedded as triggering condition associated with a matter management workflow screen (e.g., an initialize matter screen). As noted above, such input from the screen designer user to define the event criterion and associated command may be stored as screen generating metadata.

FIG. 6 shows screenshot (600) of a matter management workflow screen "rate request" that has been generated from screen generating metadata. In the example shown in FIG. 6, this form is prepared by a corporation legal department for requesting via email contracted outside law firm to submit billing rate information. As shown, screenshot (600) includes data entry fields such as subject (601) and note (602) for receiving user input to prepare the body of the email. In addition, the vendor list (603) is presented to allow selection of recipients for this email request. The content of this vendor list (603) is retrieved from the matter management workflow data store. As described above, the matter management workflow screen "rate request" is generated on a corporation legal department workstation (i.e., matter management workflow user device) inside the corporation firewall using screen generating metadata that flows across the corporation network freely.

FIG. 7A shows screenshot (700a) of a matter management workflow remote screen "time keeper request list view" that has been generated from remote screen generating metadata. In the example shown in FIG. 7A, this form is prepared by a outside law firm to view pending billing rate request received from the corporation client described in FIG. 6 above. As shown, screenshot (700a) includes data entry fields such as vendor account login (701) and time keeper request list (702). As described above, the matter management workflow remote screen "time keeper request list view" is generated on outside law firm workstation (i.e., remote user device) outside the corporation firewall using remote screen generating metadata that flows across the corporation firewall based on associated security attribute metametadata. Accordingly, outside law firms can only view a limited portion of the screens that are designated for collaboration in the matter management workflow such as the time keeper request list view screen shown in screenshot (700a). In this manner, other matter management workflow screens relating to confidential information are not viewable outside of the corporation firewall because the required screen generating metadata are blocked at the corporation firewall based on metadata level security attribute stored as metametadata.

FIG. 7B shows screenshot (700b) of a matter management workflow remote screen "time keeper request item view" that has been generated from remote screen generating metadata. This remote screen is similar to the "time keeper request list view" screen depicted in screenshot (700a) above with the exception that the list view includes a list to request items while the item view shows details of a single selected item from the list. Both the list information and the item information are retrieved from the matter management workflow data store of the corporation that flow across the corporation firewall based on security attribute metametadata.

Figure 8A:
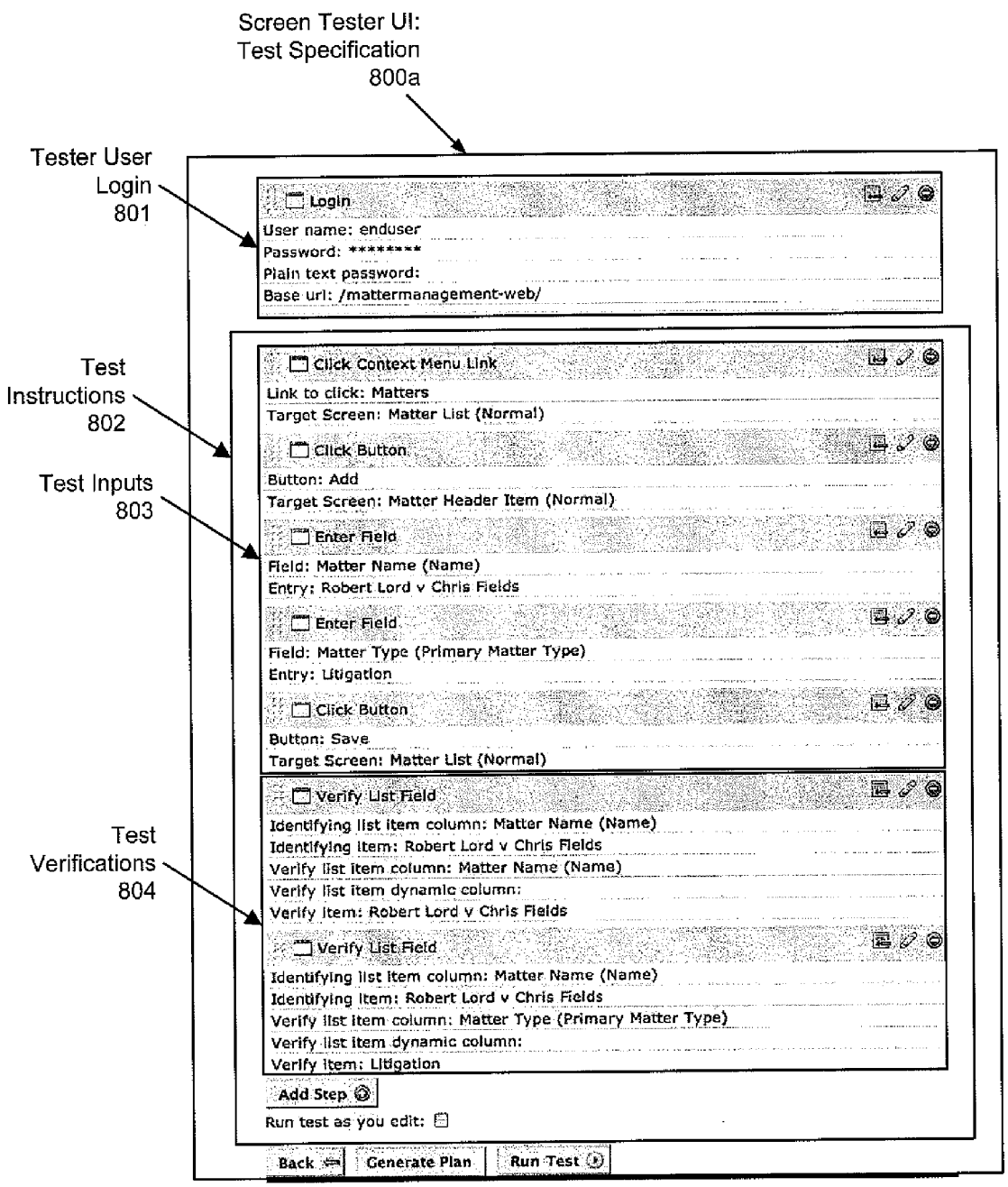

FIG. 8A shows screenshot (800a) of a screen tester UI used for a screen tester user to specify test instructions (802). As shown in FIG. 8A, the test instructions (802) include test inputs (803) and test verifications (804). For example, the test inputs (803) includes a sequence of steps each having an action (e.g., click context menu link, click button, enter field, etc.) and corresponding screen objects to be acted upon (e.g., "link to click: matters, target screen: matter list", "button: add, target screen: matter header item", "field: matter type, "entry: litigation", etc.). In this example, "matters" and "save" are screen objects used in "matter list" screen while "add," "matter name," and "matter type" are screen objects used in "matter header item" screen. Further, the test verification (804) includes a set of data items (e.g., "matter name" and "matter type") in the matter management workflow data store to be verified subsequent to applying the test inputs (803) to the aforementioned sequence of screen objects. It is noted that the test instructions (802[[1]]) are specified by the tester user using a test instruction specification language illustrated above that includes a syntax of (verb: element) where elements are screen objects. As described above, the test instructions (802) are converted (e.g., compiled prior to being applied or interpreted while being applied) into test sequences using underlying metadata of the screen objects referenced in the test instructions (802).

FIG. 8B shows screenshot (800b) of a screen tester UI used for a screen tester user to view previously prepared test instructions (802) from which screens of a matter management workflow may be tested, for example as regression verification when screens are modified. As noted above, part of the matter management workflow may be adapted for collaboration among corporation and outside law firms imposing change requirements due to compatibility of corporation procedures/practices with respect tot outside law firm procedures/practices.

Figure 9A:
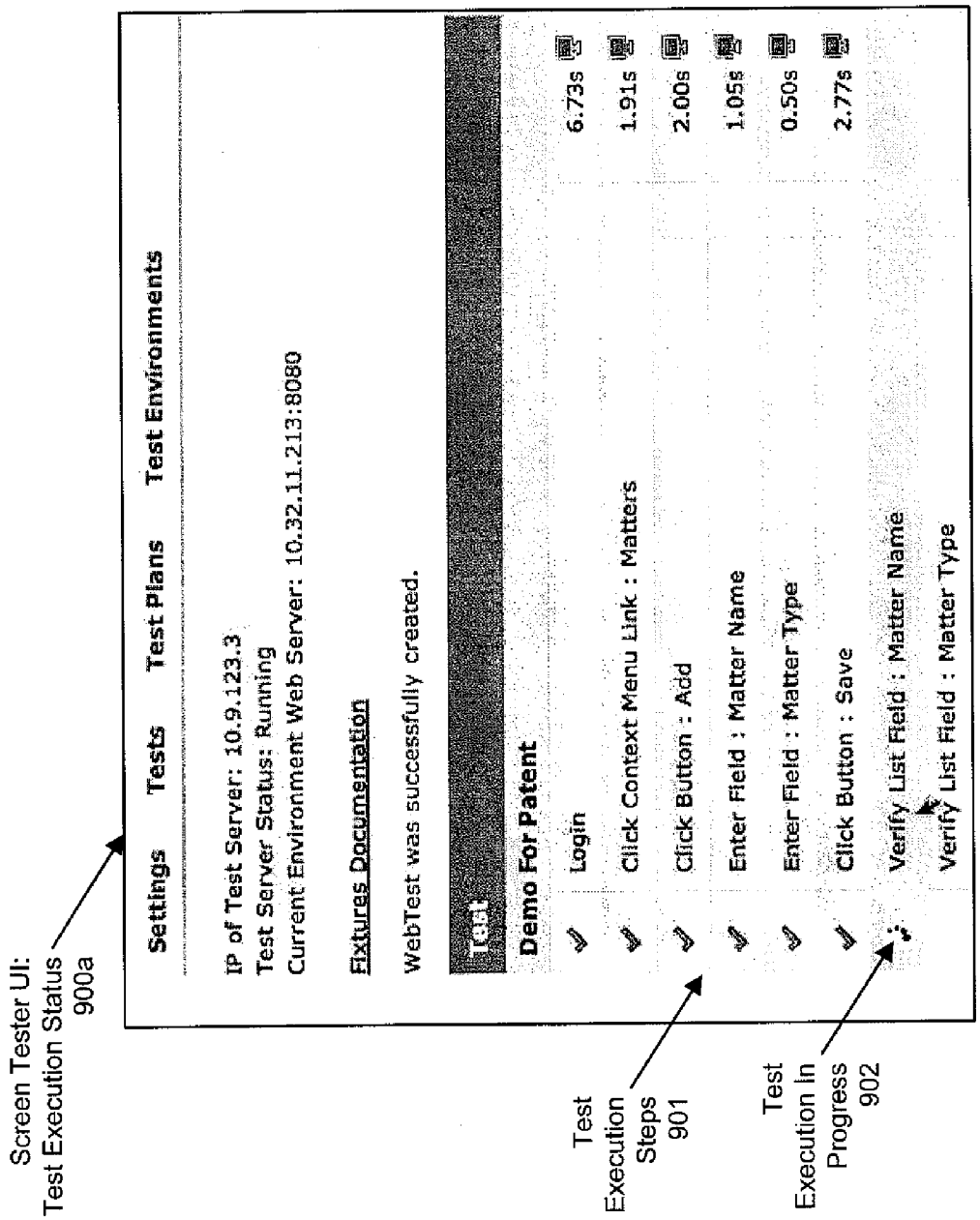

FIG. 9A shows screenshot (900a) of a screen tester UI used for a screen tester user to view screen test execution status. As shown in FIG. 9A, each line item (901a) specified in the test instructions (802) above is executed in a sequence and check marked when completed without error. Further, the currently executing line item in the test instructions (802) is identified by a progress marker (902).

Figure 9B:
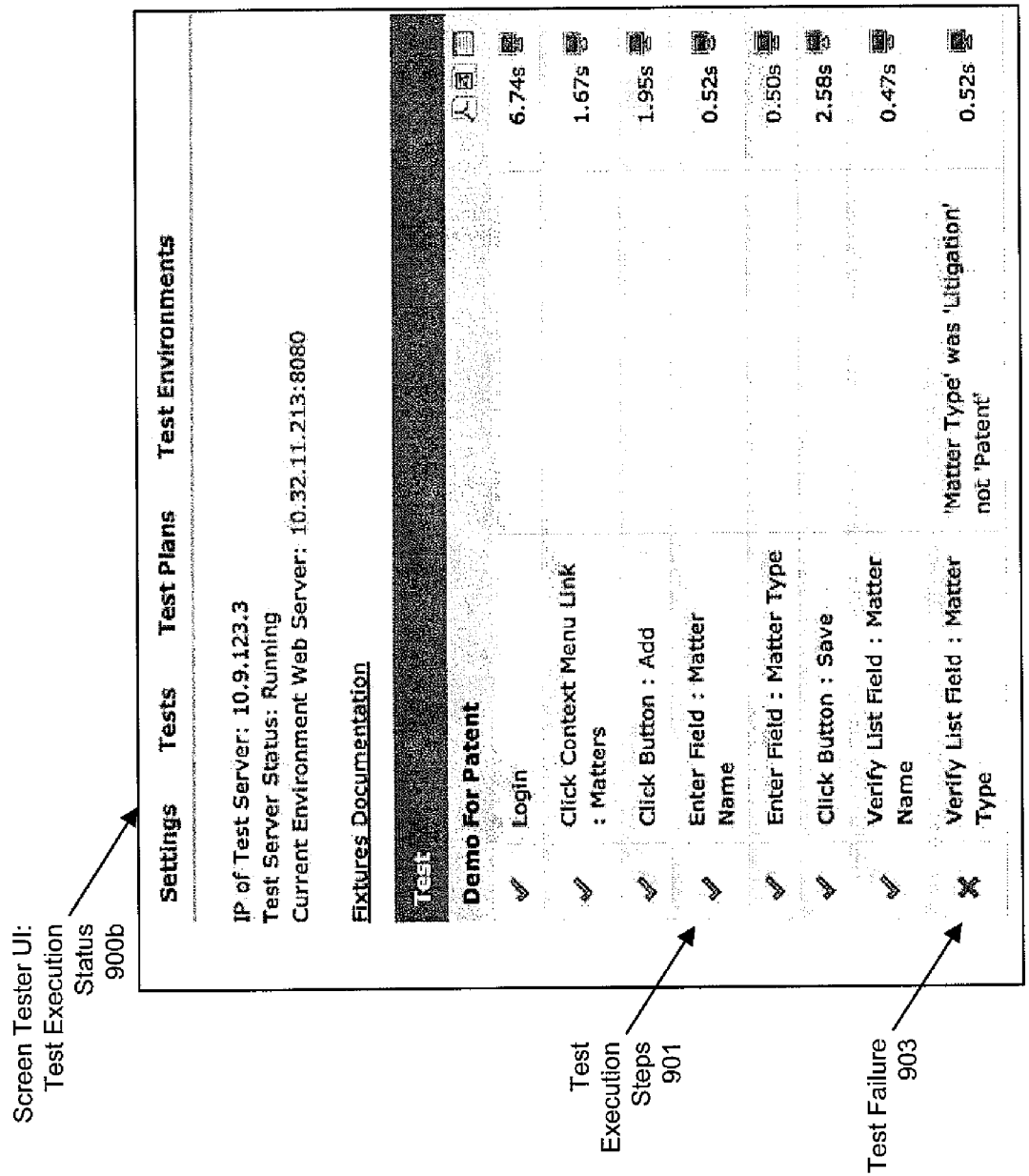

FIG. 9B shows screenshot (900b) which is a later version of the screenshot (900a) above that is captured later in time. As shown in FIG. 9B, an error (903) occurred when executing a particular test sequence to verify matter type. The error (903) is highlighted (e.g., in red color) using and "X" mark as an alert.

Figure 9C:
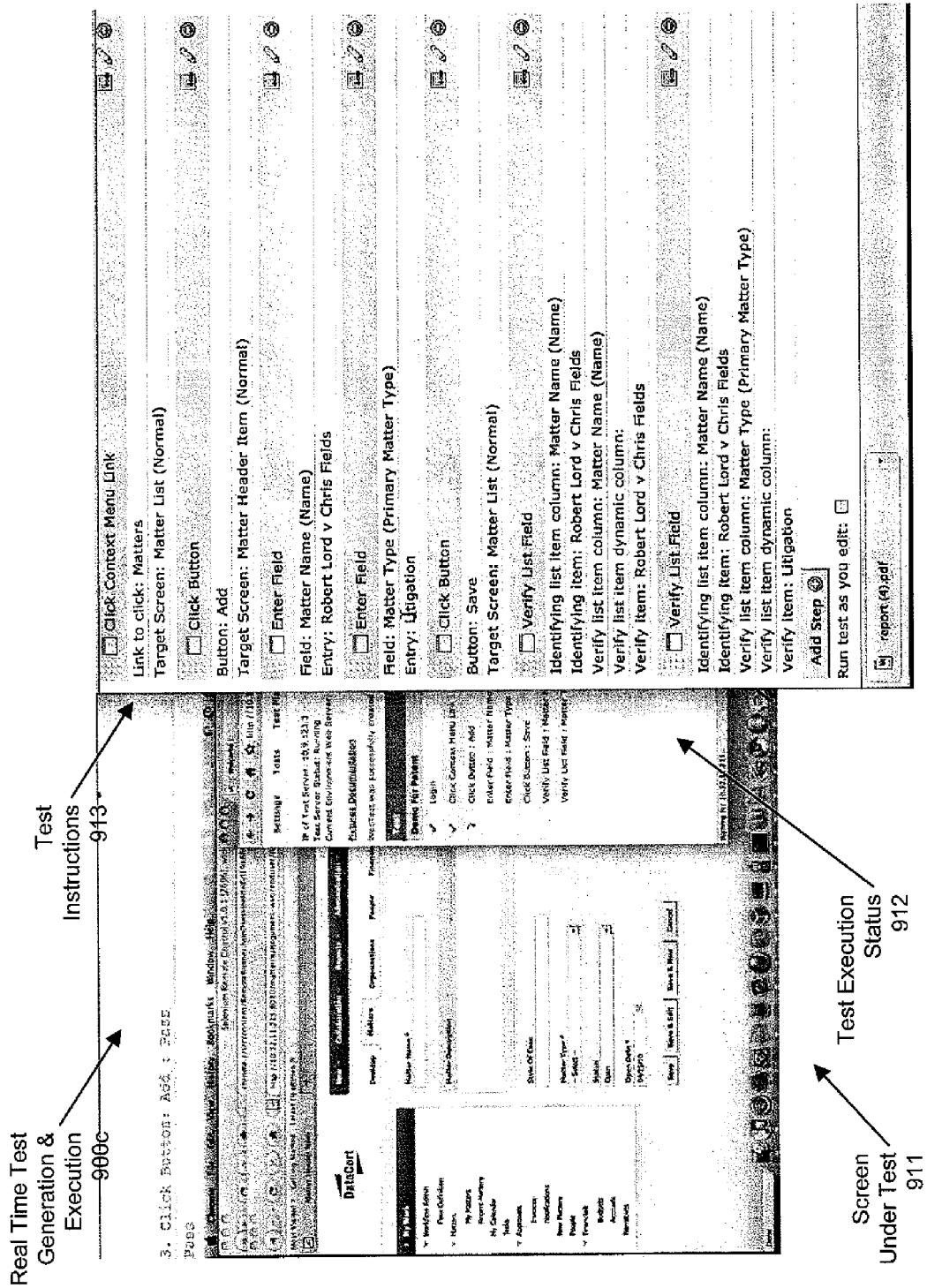

FIG. 9C shows screenshot (900c) of a screen tester UI used for a screen tester user to view screen under test (911) and screen test execution status (912) while editing the test instructions (913) in real time. As shown in FIG. 9C, the test execution status (921) and the test instructions (913) are essentially the same as test execution status (900a) and the test instructions (802) above. The screen under test (911) may be any screen of the matter management workflow that may be viewed, tested, and verified interactively. When an error is detected, the screen under test (911) may be debugged/tested in an iterative manner with the ability for the screen test designer to compose needed test instruction in real time such that details of the error may be fully characterized. Although not specifically shown, screen designer UI may also be viewed together with the screen under test (911), screen test execution status (912), and test instructions (913) in real time such that the screen designer user may modify and regenerate the screen in real time based on the characterization of error to address the failure.

Figure 10:
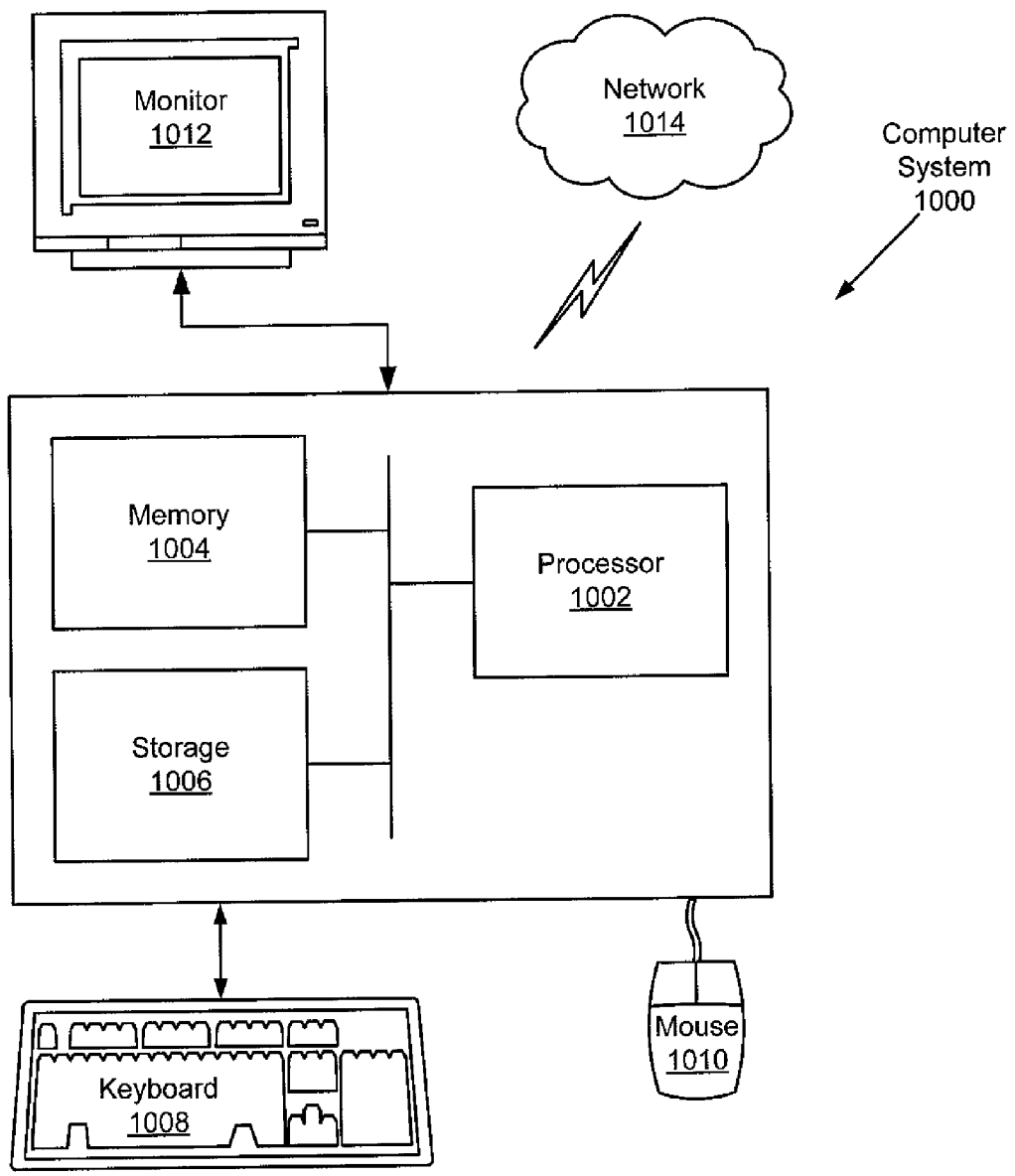
FIG. 10 depicts a computer system in accordance with one or more embodiments of the invention.

Embodiments of the invention may be implemented on virtually any type of computer regardless of the platform being used. For example, as shown in FIG. 10, a computer system (1000) includes one or more processor(s) (1002), associated memory (1004) (e.g., random access memory (RAM), cache memory, flash memory, etc.), a storage device (1006) (e.g., a hard disk, an optical drive such as a compact disk drive or digital video disk (DVD) drive, a flash memory stick, etc.), and numerous other elements and functionalities typical of today's computers (not shown). The computer (1000) may also include input means, such as a keyboard (1008), a mouse (1010), or a microphone (not shown). Further, the computer (1000) may include output means, such as a monitor ((1012) (e.g., a liquid crystal display (LCD), a plasma display, or cathode ray tube (CRT) monitor). The computer system (1000) may be connected to a network (1014) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (1000) includes at least the minimal processing, input, and/or output means necessary to practice embodiments of the invention.

Further, those skilled in the art will appreciate that one or more elements of the aforementioned computer system (1000) may be located at a remote location and connected to the other elements over a network. Further, embodiments of the invention may be implemented on a distributed system having a plurality of nodes, where each portion of the invention (e.g., various elements of the computer system (120), the repository (130), etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, a file, or any other computer readable storage device.

While specific workflow configuration and business logic scenario are used as examples in the description above, those skilled in the art will appreciate, with the benefit of this disclosure that the system and method of the invention may apply to other workflow configurations and business logic scenarios without deviating from the spirit of the invention. Further, while the examples described above pertain to legal matter management workflow, it is contemplated that the invention may be equally applicable to business activity management workflow practiced in other industries (e.g., claim processing workflow for insurance carriers, vendor project management workflow for production industry, third party service provider management workflow for any applicable industry, etc.) and the workflow may be applicable to various different types of business activities such as timer keeper billing, claim processing, shipping and invoicing, contract administration, or any types of project management activities. Accordingly, the term "matter management workflow" may also include any type of business activity management workflow without being limited to the legal industry. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for navigating a matter management workflow using a plurality of screens, comprising:
   obtaining, using a central processing unit (CPU) of a computer system, metadata specifying one or more screens of the plurality of screens based on a business logic of the matter management workflow, wherein the business logic includes descriptions of logical steps to perform a workflow task of the matter management workflow;

generating, using the CPU and based on the metadata, the one or more screens, each comprising a plurality of screen objects,
- wherein the matter management workflow comprises a sequence of the plurality of screen objects specified by the metadata based on the business logic,
- wherein the sequence comprises a plurality of multiple screen objects of a first screen and an action button of a second screen, wherein the plurality of multiple screen objects acquires user input,
- wherein the metadata of the plurality of multiple screen objects collectively defines a command to perform the workflow task using the plurality of screens, wherein the command is activated via the action button which may be used in another screen of the plurality of screens within the matter management workflow, and
- wherein the metadata of the action button references the command corresponding to the plurality of multiple screen objects;

receiving, in response to generating the screen, a matter management user input via the plurality of screen objects to navigate the matter management workflow;

receiving a screen tester user input comprising a first specification identifying at least the action button and a test action to be applied to the action button;

generating, using the first specification and without further user intervention, a test sequence for verifying a workflow data item that is affected by the workflow task, wherein the test sequence operates on the metadata to emulate the test action;

applying the test sequence to generate a first result, wherein the first result depicts an evaluation of navigating the matter management workflow according to the business logic, wherein applying the test sequence comprises interpreting the action button based on the metadata to activate the command corresponding to the plurality of multiple screen objects for performing the workflow task; and generating an alert in response to the first result indicating a violation to the business logic.

2. The method of claim 1, further comprising:
receiving a screen designer user input identifying the plurality of screen objects and comprising attributes of the plurality of screen objects, wherein the screen designer user input is based on the business logic; and
storing the screen designer user input as at least a portion of the metadata.

3. The method of claim 2, wherein the plurality of screen objects comprise a data entry field and the attributes comprise a designation of the data entry field as at least one selected from a group consisting of a text field and a drop down menu.

4. The method of claim 3, wherein the plurality of screen objects further comprise an action button and the attributes comprise a designation of the action button for activating a first command comprising functionality to access the data store based on the business logic, wherein the screen designer user input further identifies the first command and comprises attributes of the first command.

5. The method of claim 4, further comprising:
detecting an event by monitoring a change in the data store based on a pre-determined criterion; and
activating, in response to detecting the event, a second command comprising functionality to access the data store based on the business logic,
wherein the screen designer user input further identifies the event and comprises the pre-determined criterion, and
wherein the screen designer user input further identifies the second command and comprises attributes of the second command.

6. The method of claim 1, further comprising:
receiving a screen designer user input comprising a change instruction to modify the one or more screens;
modifying the metadata to generate modified metadata based on the change instruction;
modifying the one or more screens to generate a modified screen based on the modified metadata; and
applying the test sequence to the modified screen to generate a second result, wherein the second result identifies a violation to the business logic.

7. The method of claim 1, further comprising:
receiving a screen designer user input comprising a change instruction to modify the one or more screens;
modifying the metadata to generate modified metadata based on the change instruction;
modifying the one or more screens to generate a modified screen based on the modified metadata;
modifying, without user intervention, the test sequence to generate a modified test sequence comprising a third specification based on the modified metadata; and
applying the modified test sequence to the modified screen to generate a second result, wherein the second result identifies a violation to the business logic.

8. The method of claim 1, further comprising:
sending, to a remote computer system and in response to receiving the matter management user input, remote metadata specifying one or more remote screens of the plurality of screens based on the business logic of the matter management workflow; and
generating, using the remote computer system and based on the remote metadata, the one or more remote screens comprising a plurality of remote screen objects, wherein the matter management workflow further comprises a sequence of the plurality of remote screen objects specified by the remote metadata based on the business logic.

9. The method of claim 1, further comprising:
displaying the one or more screens using a web browser on a matter management user device, wherein applying the test sequence comprises:
sending the test sequence to a web testing application for applying to the one or more screens displayed on the matter management user device;
retrieving, in response to sending the test sequence thereto, a resultant screen content from the matter management user device using the web testing application; and
verifying the resultant screen content based on the test sequence to generate the evaluation.

10. The method of claim 1, wherein the one or more screens are generated based on the metadata while navigating the matter management workflow.

11. The method of claim 1, wherein the test sequence is generated based on the first specification while applying the test sequence.

12. A method for navigating a matter management workflow using a plurality of screens, comprising:
receiving a screen designer user input identifying a plurality of screen objects of the plurality of screens and comprising attributes of the plurality of screen objects, wherein the screen designer user input is based on a business logic of the matter management workflow comprising a sequence of the plurality of screen objects to perform a workflow task of the matter management workflow;

storing the screen designer user input as metadata;

generating, using a central processing unit (CPU) of a computer system and based on the metadata, one or more screens of the plurality of screens;

receiving, in response to generating the one or more screens, a matter management user input via the plurality of screen objects to navigate the matter management workflow for performing the workflow task;

sending, to a remote computer system and in response to receiving the matter management user input, remote metadata specifying one or more remote screens of the plurality of screens based on the business logic of the matter management workflow, wherein the one or more remote screens comprise a plurality of remote screen objects;

generating, using the remote computer system and based on the remote metadata, the one or more remote screens, wherein the matter management workflow further comprises a sequence of the plurality of remote screen objects specified by the remote metadata based on the business logic, wherein the sequence comprises a plurality of multiple remote screen objects of a first remote screen and a remote action button of a second remote screen, wherein the plurality of multiple remote screen objects acquires user input, wherein the remote metadata of the multiple remote screen objects collectively defines a command to perform the workflow task using the plurality of screens, wherein the command is activated via the remote action button which may be used in another remote screen of the plurality of screens within the matter management workflow, and wherein the remote metadata of the remote action button references the command corresponding to the multiple remote screen objects;

displaying the one or more remote screens using a web browser on a remote matter management user device;

receiving, in response to displaying the one or more remote screens, a remote matter management user input via the plurality of remote screen objects to further navigate the matter management workflow for performing the workflow task;

receiving a screen tester user input comprising a first specification identifying at least the remote action button and a test action to be applied to the remote action button;

generating, based on the first specification and without further user intervention, a test sequence for verifying a workflow data item that is affected by the workflow task, wherein the test sequence operates on the remote metadata to emulate the test action;

sending the test sequence to a web testing application for applying to the one or more remote screens displayed on the remote matter management user device, wherein applying the test sequence comprises interpreting the remote action button based on the remote metadata to activate the command corresponding to the multiple remote screen objects for performing the workflow task;

retrieving, in response to sending the test sequence thereto, resultant remote screen content from the remote matter management user device using the web testing application;

verifying the resultant remote screen content based on the test sequence to generate an evaluation of navigating the matter management workflow at the remote computer system according to the business logic; and generating an alert in response to the evaluation indicating a violation to the business logic at the remote computer system.

13. The method of claim 12, wherein the one or more remote screens are generated based on the metadata while navigating the matter management workflow.

14. The method of claim 12, wherein the test sequence is generated based on the first specification while applying the test sequence.

15. A system for navigating a matter management workflow using a plurality of screens, comprising:

a central processing unit (CPU);

a screen generator executing on a CPU and configured to generate, based on metadata, one or more screens of the plurality of screens comprising a plurality of screen objects, wherein the matter management workflow comprises a sequence of the plurality of screen objects specified by the metadata based on a business logic of the matter management workflow, wherein the business logic includes descriptions of logical steps to perform a workflow task of the matter management workflow, wherein the sequence comprises a plurality of multiple screen objects of a first screen and an action button of a second screen, wherein the plurality of multiple screen objects acquires user input, wherein the metadata of the plurality of multiple screen objects collectively defines a command to perform the workflow task using the plurality of screens, wherein the command is activated via the action button which may be used in another screen of the plurality of screens within the matter management workflow, and wherein the metadata of the action button references the command corresponding to the plurality of multiple screen objects;

a test sequence generator executing on a CPU and configured to generate, from a first specification identifying at least the action button and a test action to be applied to the action button, a test sequence for verifying a workflow data item that is affected by the workflow task, wherein the test sequence operates on the metadata to emulate the test action;

a repository configured to store the metadata and the test sequence; and memory configured to store instructions executed by the CPU to:

obtain the metadata from a repository, generate the one or more screens using the screen generator, receive, in response to generating the one or more screens, a matter management user input via the plurality of screen objects to navigate the matter management workflow, receive a screen tester user input comprising the first specification, generate the test sequence using the test sequence generator, apply the test sequence to generate a first result, wherein the first result depicts an evaluation of navigating the matter management workflow according to the business logic, wherein applying the test sequence comprises interpreting the action button based on the metadata to activate the command corresponding to the plurality of multiple screen objects for performing the workflow task, and generate an alert in response to the first result indicating a violation to the business logic.

16. The system of claim 15, wherein the instructions are executed by the CPU to:
receive a screen designer user input identifying the plurality of screen objects and comprising attributes of the plurality of screen objects, wherein the screen designer user input is based on the business logic; and
store the screen designer user input as at least a portion of the metadata in the repository.

17. The system of claim 16, wherein the plurality of screen objects comprise a data entry field and the attributes comprise a designation of the data entry field as at least one selected from a group consisting of a text field and a drop down menu.

18. The system of claim 17, wherein the plurality of screen objects further comprise an action button and the attributes comprise a designation of the action button for activating a first command comprising functionality to access the data store based on the business logic, wherein the screen designer user input further identifies the first command and comprises attributes of the first command.

19. The system of claim 18, wherein the instructions are executed by the CPU to:
detect an event by monitoring a change in the data store based on a pre-determined criterion; and
activate, in response to detecting the event, a second command comprising functionality to access the data store based on the business logic,
wherein the screen designer user input further identifies the event and comprises the pre-determined criterion, and
wherein the screen designer user input further identifies the second command and comprises attributes of the second command.

20. The system of claim 15, wherein the instructions are executed by the CPU to:
receive a screen designer user input comprising a change instruction to modify the one or more screens;
modify the metadata to generate modified metadata based on the change instruction;
modify the one or more screens to generate a modified screen based on the modified metadata; and
apply the test sequence to the modified screen to generate a second result, wherein the second result identifies a violation to the business logic.

21. The system of claim 15, wherein the instructions are executed by the CPU to:
receive a screen designer user input comprising a change instruction to modify the one or more screens;
modify the metadata to generate modified metadata based on the change instruction;
modify the one or more screens to generate a modified screen based on the modified metadata;
modify, without user intervention, the test sequence to generate a modified test sequence comprising a third specification based on the modified metadata; and
apply the modified test sequence to the modified screen to generate a second result, wherein the second result identifies a violation to the business logic.

22. The system of claim 15, wherein the instructions are executed by the CPU to:
send, to a remote computer system and in response to receiving the matter management user input, remote metadata specifying one or more remote screens of the plurality of screens based on the business logic of the matter management workflow;
generate, using the remote computer system and based on the remote metadata, the one or more remote screens comprising a plurality of remote screen objects, wherein the matter management workflow further comprises a sequence of the plurality of remote screen objects specified by the remote metadata based on the business logic.

23. The system of claim 15, further comprising:
a web browser executing on a matter management user device and configured to display the screen; and
a web testing application configured to:
apply the test sequence to the screen displayed on the matter management user device; and
retrieve, in response to applying the test sequence thereto, resultant screen content from the matter management user device,
wherein the instructions are executed by the CPU to:
cause the screen to be displayed on the matter management user device in response to the generation thereof;
send the test sequence to the web testing application;
receive the resultant screen content from the web testing application; and
verify the resultant screen content based on the test sequence to generate the first result.

24. The system of claim 15, wherein the one or more screens are generated based on the metadata while navigating the matter management workflow.

25. The system of claim 15, wherein the test sequence is generated based on the first specification while applying the test sequence.

26. A non-transitory computer readable storage medium storing instructions for navigating a matter management workflow using a plurality of screens, the instructions when executed by a computer comprising functionality to:
obtain, using a central processing unit (CPU) of a computer system, metadata specifying one or more screens of the plurality of screens based on a business logic of the matter management workflow, wherein the business logic includes descriptions of logical steps to perform a workflow task of the matter management workflow;
generate, using the CPU and based on the metadata, the one or more screens, each comprising a plurality of screen objects,
wherein the matter management workflow comprises a sequence of the plurality of screen objects specified by the metadata based on the business logic,
wherein the sequence comprises a plurality of multiple screen objects of a first screen and an action button of a second screen, wherein the plurality of multiple screen objects acquires user input,
wherein the metadata of the plurality of multiple screen objects collectively defines a command to perform the workflow task using the plurality of screens, wherein the command is activated via the action button which may be used in another screen of the plurality of screens within the matter management workflow, and
wherein the metadata of the action button references the command corresponding to the plurality of multiple screen objects;
receive, in response to generating the screen, a matter management user input via the plurality of screen objects to navigate the matter management workflow;
receive a screen tester user input comprising a first specification identifying at least the action button and a test action to be applied to the action button;
generate, using the first specification and without further user intervention, a test sequence for verifying a workflow data item that is affected by the workflow task, wherein the test sequence operates on the metadata to emulate the test action;

apply the test sequence to generate a first result, wherein the first result depicts an evaluation of navigating the matter management workflow according to the business logic, wherein applying the test sequence comprises interpreting the action button based on the metadata to activate the command corresponding to the plurality of multiple screen objects for performing the workflow task; and generate an alert in response to the first result indicating a violation to the business logic.

* * * * *